United States Patent [19]

Asao et al.

[11] Patent Number: 6,083,574
[45] Date of Patent: Jul. 4, 2000

[54] ALIGNING METHOD OF LIQUID CRYSTAL, PROCESS FOR PRODUCING LIQUID CRYSTAL DEVICE, AND LIQUID CRYSTAL DEVICE PRODUCED BY THE PROCESS

[75] Inventors: Yasufumi Asao, Atsugi; Yukio Hanyu, Isehara; Koichi Sato, Atsugi; Masahiro Terada, Hadano; Koji Noguchi, Sagamihara, all of Japan

[73] Assignee: Canon Kabushiki Kaisha, Tokyo, Japan

[21] Appl. No.: 09/123,330

[22] Filed: Jul. 28, 1998

[30] Foreign Application Priority Data

Jul. 31, 1997 [JP] Japan ................................. 9-220236
Jul. 24, 1998 [JP] Japan ............................... 10-209028

[51] Int. Cl.[7] .......................... G02F 1/1333; C09K 19/52
[52] U.S. Cl. ..................... 428/1.1; 252/299.01; 349/172; 349/174; 349/184
[58] Field of Search ........................ 252/299.01; 428/1.1; 349/184, 133, 174, 172

[56] References Cited

U.S. PATENT DOCUMENTS

| | | | |
|---|---|---|---|
| 4,367,924 | 1/1983 | Clark et al. | 350/334 |
| 4,820,026 | 4/1989 | Okada et al. | 350/341 |
| 4,932,757 | 6/1990 | Hanyu et al. | 350/339 R |
| 4,932,758 | 6/1990 | Hanyu et al. | 350/350 S |
| 5,007,716 | 4/1991 | Hanyu et al. | 350/336 |
| 5,103,331 | 4/1992 | Taniguchi et al. | 359/81 |
| 5,165,076 | 11/1992 | Tsuboyama et al. | 359/75 |
| 5,192,596 | 3/1993 | Hanyu et al. | 428/1 |
| 5,200,848 | 4/1993 | Hanyu et al. | 359/100 |
| 5,262,082 | 11/1993 | Janulis et al. | 252/299.01 |
| 5,268,780 | 12/1993 | Hanyu et al. | 359/75 |
| 5,268,783 | 12/1993 | Yoshinaga et al. | 359/103 |
| 5,316,805 | 5/1994 | Hanyu et al. | 428/1 |

(List continued on next page.)

FOREIGN PATENT DOCUMENTS

| | | |
|---|---|---|
| 56-107216 | 8/1981 | Japan . |
| 59-193426 | 11/1984 | Japan . |
| 59-193427 | 11/1984 | Japan . |
| 60-156046 | 8/1985 | Japan . |
| 60-156047 | 8/1985 | Japan . |

OTHER PUBLICATIONS

M. Shadt and W. Helfrich, "Voltage–Dependent Optical Activity of a Twisted Nematic Liquid Crystal," *Applied Physics Letters* Feb. 15, 1971, vol. 19, No. 4: 127–128.

A. Fukuda & H. Takezoe, *Structure and Properties of Ferroelectric Liquid Crystals*, 1990: 344–357.

M.D. Radcliffe et al, "Smectic A and Smectic C Materials with Large Negative Thermal Expansion Coefficients," 4th International Ferroelectric Liquid Crystal Conference, 1993, P–46: 169–170.

K. Miyasato et al, "Direct Method with Triangular Waves for Measuring Spontaneous Polarization in Ferroelectric Liquid Crystals," *Japanese Journal of Applied Physics*, vol. 22, No. 10, 1983: L661–L663.

*Primary Examiner*—Shean C. Wu
*Attorney, Agent, or Firm*—Fitzpatrick, Cella, Harper & Scinto

[57] ABSTRACT

An aligning method of a chiral smectic liquid crystal includes the steps of: disposing a chiral smectic liquid crystal between a pair of electrode plates, the chiral smectic liquid crystal having a layer spacing-changing characteristic providing a layer spacing which increases on temperature decrease in a first temperature range in smectic A phase; and subjecting the chiral smectic liquid crystal to a heat treatment including a sequence of cooling from a higher temperature phase to a second temperature range in smectic A phase including at least a portion of the first temperature range, at least one cycle of heating and cooling within the second temperature range, and further cooling to a smectic phase lower than smectic phase. The heat treatment, particularly at least one cycle of heating and cooling in smectic A phase, is effective in suppressing an alignment (orientation) irregularity due to the presence of two regions different in characteristics, thus improving a drive margin.

32 Claims, 10 Drawing Sheets

U.S. PATENT DOCUMENTS

| | | | |
|---|---|---|---|
| 5,320,883 | 6/1994 | Asaoka et al. | 428/1 |
| 5,325,219 | 6/1994 | Hanyu et al. | 359/78 |
| 5,347,381 | 9/1994 | Shinomiya et al. | 359/78 |
| 5,353,141 | 10/1994 | Onuma et al. | 359/76 |
| 5,381,256 | 1/1995 | Hanyu et al. | 359/75 |
| 5,417,883 | 5/1995 | Epstein et al. | 252/299.01 |
| 5,419,932 | 5/1995 | Togano et al. | 428/1 |
| 5,426,525 | 6/1995 | Hanyu et al. | 359/76 |
| 5,452,114 | 9/1995 | Hotta et al. | 359/75 |
| 5,453,861 | 9/1995 | Shinjo et al. | 359/78 |
| 5,467,209 | 11/1995 | Hotta et al. | 359/74 |
| 5,473,448 | 12/1995 | Yoshinaga et al. | 359/51 |
| 5,475,515 | 12/1995 | Yoshinaga et al. | 359/52 |
| 5,510,159 | 4/1996 | Asaoka et al. | 428/1 |
| 5,541,752 | 7/1996 | Taniguchi et al. | 359/78 |
| 5,543,943 | 8/1996 | Hanyu et al. | 359/43 |
| 5,582,763 | 12/1996 | Yamada et al. | 252/299.01 |
| 5,583,680 | 12/1996 | Nakamura et al. | 349/134 |
| 5,589,964 | 12/1996 | Hotta et al. | 349/160 |
| 5,641,427 | 6/1997 | Shinjo et al. | 252/299.01 |
| 5,750,214 | 5/1998 | Ito et al. | 428/1 |
| 5,786,879 | 7/1998 | Kodera et al. | 349/134 |
| 5,812,227 | 9/1998 | Toshida et al. | 349/88 |

δ (DEG.)

δ (DEG.)

ALIGNING METHOD OF LIQUID CRYSTAL, PROCESS FOR PRODUCING LIQUID CRYSTAL DEVICE, AND LIQUID CRYSTAL DEVICE PRODUCED BY THE PROCESS

FIELD OF THE INVENTION AND RELATED ART

The present invention relates to an aligning method of a chiral smectic liquid crystal and a liquid crystal device using such a chiral smectic liquid crystal for use in light-valves for flat-panel displays, projection displays, printers, etc. The present invention also relates to a process for producing the liquid crystal device and a liquid crystal apparatus using the liquid crystal device.

As a type of a liquid crystal device widely used heretofore, there has been known a liquid crystal device, including a type using a twisted nematic (TN) liquid crystal as disclosed by M. Schadt and W. Helfrich, "Applied Physics Letters", Vol. 18, No. 4 (Feb. 17, 1971), pp. 127–128.

The liquid crystal device using a TN-liquid crystal includes a simple matrix-type liquid crystal device which is advantageous from a viewpoint of easy device preparation and production cost. This type of liquid crystal device is however accompanied with a problem that it is liable to cause crosstalk when driven in a multiplex manner by using an electrode matrix with a high pixel density, and therefore the number of pixels is retracted. Further, such a liquid crystal device provides a slow response speed of 10 milliseconds or above, thus being only applicable to restricted uses for displays.

In contrast with such a simple matrix-type liquid crystal device, a TFT-type liquid crystal device has been developed in recent years, wherein each pixel is provided with and driven with a TFT (thin film transistor). As a result, the problems of crosstalk and response speed can be solved but, on the other hand, a larger area device of the type poses an extreme difficulty in industrial production thereof without inferior pixels. Further, even if such production is possible, the production cost is liable to be increased enormously.

For providing improvements to the above-mentioned difficulties of the conventional types of liquid crystal devices, a liquid crystal device using a liquid crystal exhibiting bistability, has been proposed by Clark and Lagerwall (Japanese Laid-Open Patent Application (JP-A) 56-107216, U.S. Pat. No. 4,367,924). As the liquid crystal exhibiting bistability, a chiral smectic or ferroelectric liquid crystal having chiral smectic C phase (SmC*) which is one of chiral smectic liquid crystal materials is generally used. Such a chiral smectic (ferroelectric) liquid crystal has a very quick response speed because it causes inversion switching based on its spontaneous polarization. In addition, the chiral smectic liquid crystal develops bistable states showing a memory characteristic and further has an excellent viewing angle characteristic. Accordingly, the chiral smectic liquid crystal is considered to be suitable for constituting a display device or a light valve of a high speed, a high resolution and a large area.

Such a chiral smectic liquid crystal is, however, accompanied with problems, such as the occurrence of zigzag-shaped alignment defects leading to a remarkable lowering in contrast (as described in, e.g., "Structures and Properties of Ferroelectric Liquid Crystals" (in Japanese) authored by Atsuo Fukuda and Hideo Takezoe; Corona Publishing Co. Ltd., (1990)). The defects are considered to be attributable to a smectic layer structure of a chiral smectic liquid crystal including two types of chevron structures different in bending direction between a pair of substrates and its large bending angle (i.e., a large layer inclination angle $\delta$ based on the substrate normal).

In recent years, there have been studied a method for forming a liquid crystal layer structure not of the bent chevron structure having the above defects but of a bookshelf structure wherein smectic liquid crystal layers are substantially perpendicular to the substrate or a structure close thereto, thereby realizing a liquid crystal device providing a high contrast.

For instance, as a liquid crystal material providing a bookshelf structure or a structure close thereto, a mesomorphic compound having a perfluoroalkyl ether terminal chain (U.S. Pat. No. 5,262,082), a liquid crystal composition containing such a mesomorphic compound (Marc D. Radcliffe et al. The 4th International Ferroelectric Liquid Crystal Conference, p-46 (1993)), etc., have been proposed. By using such a liquid crystal material, it is possible to provide a bookshelf structure or a similar structure having a small layer inclination angle without using an external field such as an external electric field.

This is attributable to a property of the above liquid crystal material (providing the bookshelf structure or the close structure thereto) such that a layer spacing of liquid crystal molecules increases as a temperature decreases toward a lower temperature (hereinafter, sometimes referred to as "layer spacing-increasing characteristic (on temperature decrease)").

In an ordinary chiral smectic liquid crystal device, when liquid crystal molecules are oriented or aligned through a cooling step from a liquid state (isotropic phase) at high temperature, the liquid crystal molecules first form a layer structure in smectic A (SmA) phase and then are tilted or inclined by a phase transition from SmA phase to chiral smectic C or $C_A$ (SmC* or SmC$_A$*) phase based on a direction of a normal to the liquid crystal molecular layers. As a result, a layer spacing is shortened by a length due to the inclination of the liquid crystal molecules from the layer normal direction. For this reason, the resultant liquid crystal molecules cannot help forming a chevron structure in order to compensate for a volume shrinkage or contraction.

On the other hand, the mesomorphic compound having a perfluoroether terminal chain has a layer spacing-increasing characteristic on temperature decrease, so that the above-mentioned shortage of the layer spacing as in the ordinary chiral smectic liquid crystal device is counterbalanced with the layer spacing-increasing characteristic even if the liquid crystal molecules are inclined by the phase transition from SmA phase to SmC* phase or SmC$_A$* phase. As a result, the layer spacing in SmC* phase (or SmC$_A$* phase) becomes substantially equal to or close to that in SmA phase. Accordingly, the mesomorphic compound having a perfluoroether terminal chain can provide the bookshelf structure or the close structure thereto having a small layer inclination angle by itself without using, e.g., an external electric field.

However, as a result of observation by our research group, liquid crystal materials having the layer spacing-increasing characteristic (on temperature decrease) have been found to provide an alignment or orientation state of liquid crystal molecules such that regions different in device characteristics, such as an apparent tilt angle and a molecular fluctuation due to a data signal voltage, are disorderly distributed within the resultant liquid crystal device. Herein, for convenience, a region providing a relatively larger apparent tilt angle and a smaller molecular fluctuation is referred to as a "P1 region" and a region providing a relatively smaller apparent tilt angle and a larger molecular fluctuation is referred to as a "P2 region".

The presence of the above alignment state including the regions different in the device characteristics is considered to be attributable to the following phenomenon.

More specifically, the layer spacing-increasing property on temperature decrease of the above-mentioned liquid crystal material is generally confirmed not only in SmC* (or SmC$_A$*) phase but also in SmA phase. In other words, by a phase transition from a higher temperature phase (e.g., isotropic phase, nematic phase or cholesteric phase) to SmA phase, a bookshelf structure or a structure close thereto having a small layer inclination angle is formed in SmA phase. When the liquid crystal material is further cooled in SmA phase, a force for extending the layer spacing is exerted on the device structure (liquid crystal device) but an entire length of the device structure in the layer normal direction, i.e., a length of (layer pitch or spacing)×(the number of layers), is constant. The layer pitch means a layer spacing in smectic phase which appears first in a cell on temperature decrease. As a result, a compressive force is exerted over the entire device structure.

However, this compressive force is liable to cause a compression irregularity (or uneven compression) providing a strongly compressed portion and a (relatively) weakly compressed portion in SmA phase due to an irregularity in, e.g., cell thickness and temperature although the compressive force should be uniformly exerted on all the molecular layers by its nature. The compression irregularity in SmA phase leads to an irregularity in device characteristics in SmC* (or SmC$_A$*) phase, thus providing P1 and P2 regions as described above.

In the case where such P1 and P2 regions different in device characteristics are located in the entire device region in a continuous or moderately changing manner, the resultant liquid crystal device is of no practical problem. However, in the case where the P1 and P2 regions are located in a discontinuous or abruptly changing manner, boundary portions of these regions cause defects, such as a lowering in contrast and an occurrence of an anomalous reverse domain, thus leading to a lowering in drive margin.

SUMMARY OF THE INVENTION

In view of the above-mentioned circumstances, an object of the present invention is to provide an aligning method of a(chiral)smectic liquid crystal capable of alleviating a (layer) compression irregularity in SmA phase on temperature decrease to suppress or minimize an occurrence of an irregularity in device characteristics in SmC* or-SmC$_A$* phase, thereby to realize a liquid crystal device with a large drive margin.

Another object of the present invention is to provide a process for producing the device and a liquid crystal apparatus using the liquid crystal device.

According to a first aspect of the present invention, there is provided an aligning method of a (chiral)smectic liquid crystal, comprising:

disposing a(chiral)smectic liquid crystal between a pair of electrode plates, said(chiral) smectic liquid crystal having a layer spacing-changing characteristic providing a layer spacing which increases on temperature decrease in a first temperature range in smectic A phase; and subjecting said chiral smectic liquid crystal to a heat treatment including a sequence of cooling from a higher temperature phase to a second temperature range in smectic A phase including at least a portion of the first temperature range, at least one cycle of heating and cooling within the second temperature range, and further cooling to a smectic phase lower than smectic A phase (generally chiral smectic (SmC* or SmC$_A$*) phase).

According to a second aspect of the present invention, there is provided a process for producing a liquid crystal device, comprising:

injecting a chiral smectic liquid crystal in isotropic phase into a gap between two contacting surfaces of a pair of oppositely disposed electrode plates, said chiral smectic liquid crystal having a layer spacing-changing characteristic providing a layer spacing which increases on temperature decrease in a first temperature range in smectic A phase; and subjecting said chiral smectic liquid crystal to a heat treatment including a sequence of cooling from isotropic phase to a second temperature range in smectic A phase including at least a portion of the first temperature range, at least one cycle of heating and cooling within the second temperature range, and further cooling to a smectic phase lower than smectic A phase (generally SmC* or SmC$_A$* phase).

According to a third aspect of the present invention, there is provided a liquid crystal device produced through the production process.

According to a fourth aspect of the present invention, there is provided a liquid crystal apparatus including the above-mentioned liquid crystal device and a drive means for driving the liquid crystal device.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
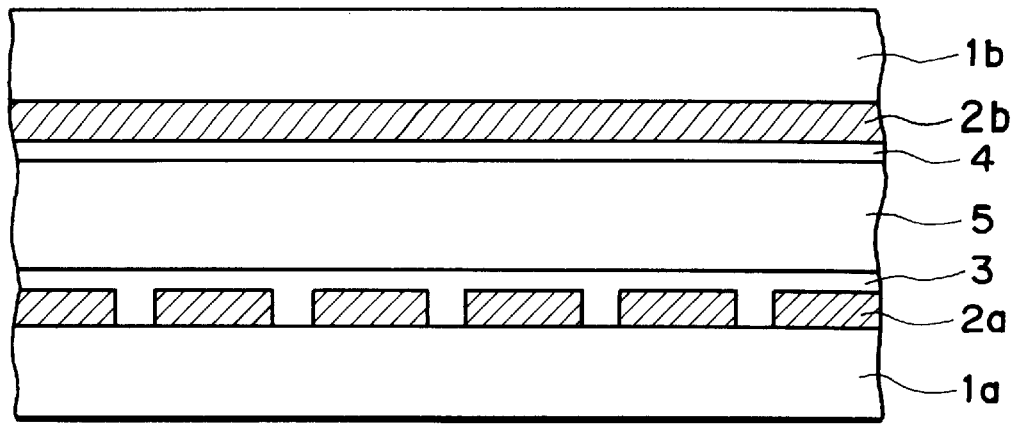
FIG. 1 is a schematic sectional view of an embodiment of a liquid crystal device according to the present invention.

The aligning method of a chiral smectic liquid crystal according to the present invention is characterized by a specific heat treatment, to a chiral smectic liquid crystal having a layer spacing-increasing characteristic on temperature decrease in SmA phase, including at least one cycle of heating and cooling within a temperature range in SmA phase. As a result, it becomes possible to obviate or alleviate an alignment (orientation) irregularity resulting from a layer compression irregularity in SmA phase intrinsic to a liquid crystal material providing by itself a bookshelf structure or a structure close thereto having a small layer inclination angle (of at most 3 degrees), thus improving a drive margin of a resultant liquid crystal device.

More specifically, according to the present invention, the layer compression irregularity caused by an increase in layer spacing by cooling the liquid crystal material is uniformized by re-heating. This is presumably because a viscosity of the liquid crystal material is lowered on temperature increase to induce a re-alignment (re-orientation) of liquid crystal molecules from a state (structure) wherein there is a positional irregularity of a pressure (compressive force) over the entire liquid crystal device to a state (structure) undergoing a uniform pressure (compressive force) being considered to be stable by its nature. In the thus-treated liquid crystal device wherein the layer compression irregularity is alleviated, an irregularity in device characteristics is suppressed or minimized to provide a large or broad drive margin.

The liquid crystal material used in the present invention has a property such that a layer spacing is decreased on temperature increase in SmA phase, thus causing a change in layer structure from a bookshelf structure (or a close structure thereto) to a chevron structure. In this instance, a possible chevron structure may include an ordinary chevron structure in which respective smectic liquid crystal molecule layers are bent at an intermediate point (generally in the vicinity of a midpoint) thereof in a direction of cell thickness, a chevron structure in which the bend of the molecular layers is observed within a planar device region referred to as ("planar chevron structure"), and a combination of the ordinary chevron structure with the planar chevron structure.

In the aligning method of the present invention, a stripe texture due to the planar chevron structure is frequently observed in a direction of a normal to the molecular layers on temperature increase in SmA phase. This stripe texture, however, disappears again or merely leaves a slight trace thereof in the course of temperature decrease, thus little affecting practical characteristics of the resultant liquid crystal device in SmC* phase or SmC$_A$* phase.

A sectional structure of a liquid crystal device suitable for the aligning method according to the present invention will be described with respect to an embodiment thereof while referring to FIG. 1.

A liquid crystal device shown in FIG. 1 includes a pair of oppositely disposed substrates 1a and 1b respectively of glass, plastic, etc., having thereon electrodes 2a and 2b, respectively, formed in prescribed patterns (herein such substrates are referred to as "electrode plates"). The electrodes 2a and 2b may comprise a transparent conductor film of, e.g., In$_2$O, SnO$_2$ or ITO (indium tin oxide). The electrodes 2a and 2b may respectively be formed in stripes and arranged to intersect each other at substantially right angles to form an electrode matrix.

Figure 5:
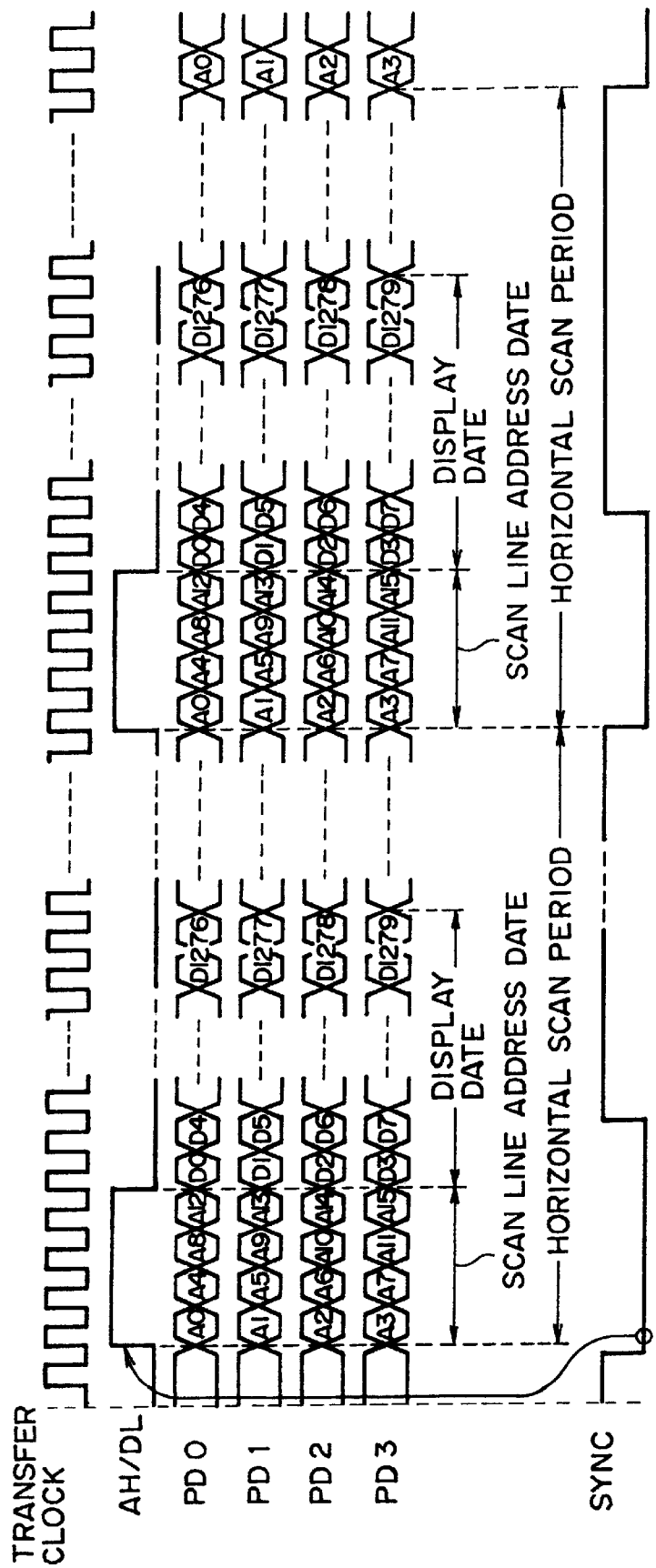
FIG. 5 is a time chart of image data communication showing time correlation between signal transfer and driving with respect to a liquid crystal display apparatus and a graphic controller.

FIG. 5 is a plan view showing such an electrode matrix used in a (chiral smectic) liquid crystal device (panel) 66 of a simple matrix-type. The liquid crystal device 66 shown in FIG. 6 includes scanning electrodes 62 (S$_1$, S$_2$, S$_3$, . . . S$_m$) provided to one substrate (e.g., corr. to the electrodes 2b in FIG. 1) and data electrodes 63 (I$_1$, I$_{2,I3}$, . . . I$_n$) provided to the other substrate (e.g., corr. to the electrodes 2a in FIG. 1) intersecting each other so as to constitute a pixel (one display unit) at each intersection together with a chiral smectic liquid crystal disposed between the scanning electrodes 62 and data electrodes 63. The liquid crystal device is driven by applying voltages to the liquid crystal through the scanning and data electrodes 62 and 63.

Referring again to FIG. 1, in the present invention, the liquid crystal device may be prepared in a reflection-type liquid crystal device by forming one of the electrodes 2a (or 2b) of, e.g., a metal. Further, the electrode structure of the liquid crystal device used in the present invention is not restricted to the above-mentioned simple matrix structure.

The electrode plates are coated with an alignment control layers 3 and 5, respectively, as desired. One of the alignment controller layers 3 and 4 may be omitted. Further, the alignment control layers 3 and 4 may be formed of an identical material or a combination of different materials.

The electrode plates having such a structure are disposed opposite to each other with a prescribed spacing therebetween, so as to sandwich therebetween a liquid crystal material 5, such as a liquid crystal assuming a chiral smectic phase.

Hereinbelow, as a preferred alignment control layers 3 and 4 suitable for a liquid crystal device using a liquid crystal material having no cholesteric phase (described hereinafter) will be described.

One of the alignment control layers 3 and 4 may preferably have a volume resistivity in the range of $1.0 \times 10^4 – 1.0 \times 10^{10}$ ohm·cm.

Such an alignment control layer may for example comprise a polycrystalline or amorphous metal oxide film, a polycrystalline or amorphous semiconductor film or a film comprising a binder and electroconductivity-imparted particles dispersed in the binder. The polycrystalline or amorphous metal oxide film, the polycrystalline or amorphous semiconductor film, and the particles may have an adjusted electroconductivity by adding conductivity-controlling impurities as desired.

Examples of the polycrystalline or amorphous metal oxide may include: oxides of Group 12 elements, such as ZnO, CdO and ZnCdO$_x$; and oxides of Group 4 and 14 elements, such as GeO$_2$, SnO$_2$, GeSnO$_x$, TiO$_2$, ZnO$_2$, and TiZrO$_x$.

Examples of the polycrystalline or amorphous semiconductor may include: Group 14 semiconductors, such as Si and SiC.

Examples of the dispersed particles may include: particles of the above-mentioned oxides of Group 12 elements, oxides of Group 4 elements, oxides of Group 14 elements, and Group 14 semiconductors.

Examples of the optionally added conductivity-controlling impurities may include: Group 13 elements, such as B, Al, Ga and In as n-type impurities (donor/electron conductivity-enhancing impurities), and Group 1 and 11 elements, such as Cu, Ag, Au and Li, as p-type impurities (acceptor/hole conductivity-enhancing impurities), respectively for doping the oxides of Group 12 elements; and Group 15 elements, such as P, As, Sb and Bi, as n-type impurities, and Group 13 elements, such as B, Al, Ga and In, as p-type impurities, respectively for doping the oxides or semiconductors of Group 14 elements.

As the conductivity-controlling impurity, a donor may be used in case where the substrate having an alignment control layer comprising a material doped with the impurity has a positive surface potential, and an acceptor may be used in case of a negative surface potential. The additive impurity concentration may be set depending on the species (particles, combination with impurities, etc.) and crystalline states (level of crystal defect density) of materials and may preferably be set to provide a free electron or free hole concentration on the order of $1.0 \times 10^{11} - 1.0 \times 10^{14}$ atm/cm$^3$ after the impurity addition. In the case of using a polycrystalline or amorphous material as a matrix material to be doped with the impurity, it may be suitable to set an actual addition level of $1.0 \times 10^{17} - 10 \times 10^{20}$ atm/cm$^3$ (on the order of 0.01–1% of the matrix material) in consideration of the efficiency of the impurity addition.

Examples of the binder material for dispersing the particles may include: SiO$_x$, TiO$_x$, ZrO$_x$, fused matrix of other oxides, and siloxane polymers.

The other alignment control layer 3 or 4) is subjected to a uniaxial aligning treatment. The thickness thereof may be at most 100 Å, preferably at most 70 Å, further preferably at most 50 Å.

Such an alignment control layer subjected to the uniaxial aligning treatment may for example be provided by forming a film of an organic material by solution coating, etc., and rubbing the film with a fibrous material, such as velvet, cloth or paper. Examples of the organic film material for constituting the alignment control layer to be provided with a uniaxial alignment control force by rubbing may include: polyvinyl alcohol, polyimide, polyamideimide, polyester, polyamide, polyesterimide, polyparaxylylene, polycarbonate, polyvinyl acetal, polyvinyl chloride, polystyrene, polysiloxane, cellulosic resin, melamine resin, urea resin and acrylic resin. It is also possible to form such an alignment control layer by oblique vapor deposition, i.e., vapor deposition in an oblique direction onto a substrate, of an oxide, such as SiO, or a nitride, to form a film provided with a uniaxial alignment control force.

In the present invention, as the alignment control layer subjected to a uniaxial aligning treatment, it is particularly preferred to use a film of a polyimide having a recurring unit represented by the following general formula P:

[Formula P]

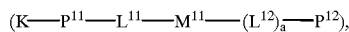

wherein K is ia tetra valent-group of

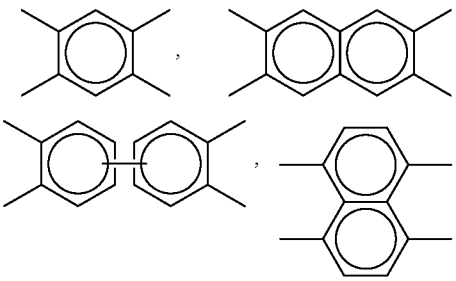

or

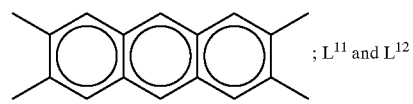

independently denote

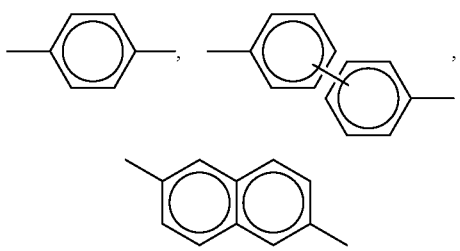

or an alkylene group having 1–20 carbon atoms; $P^{11}$ and $P^{12}$ denote an imide bond; $M^{11}$ denotes a single bond or —O—; and a is 0, 1 or 2.

Specific examples of the polyimide may include those having the following recurring units:

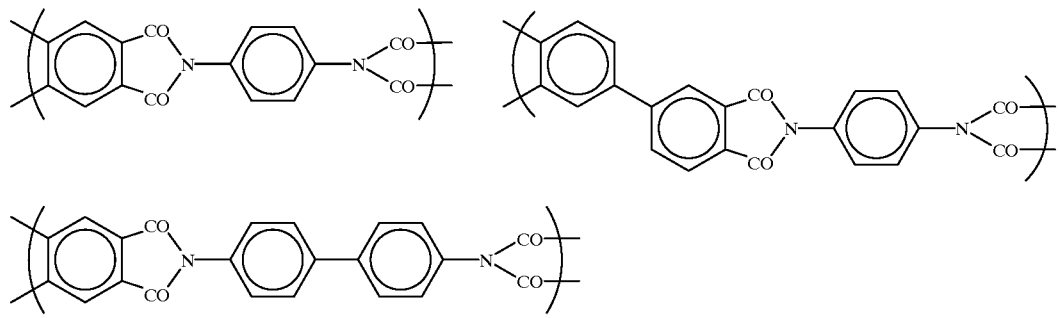

-continued

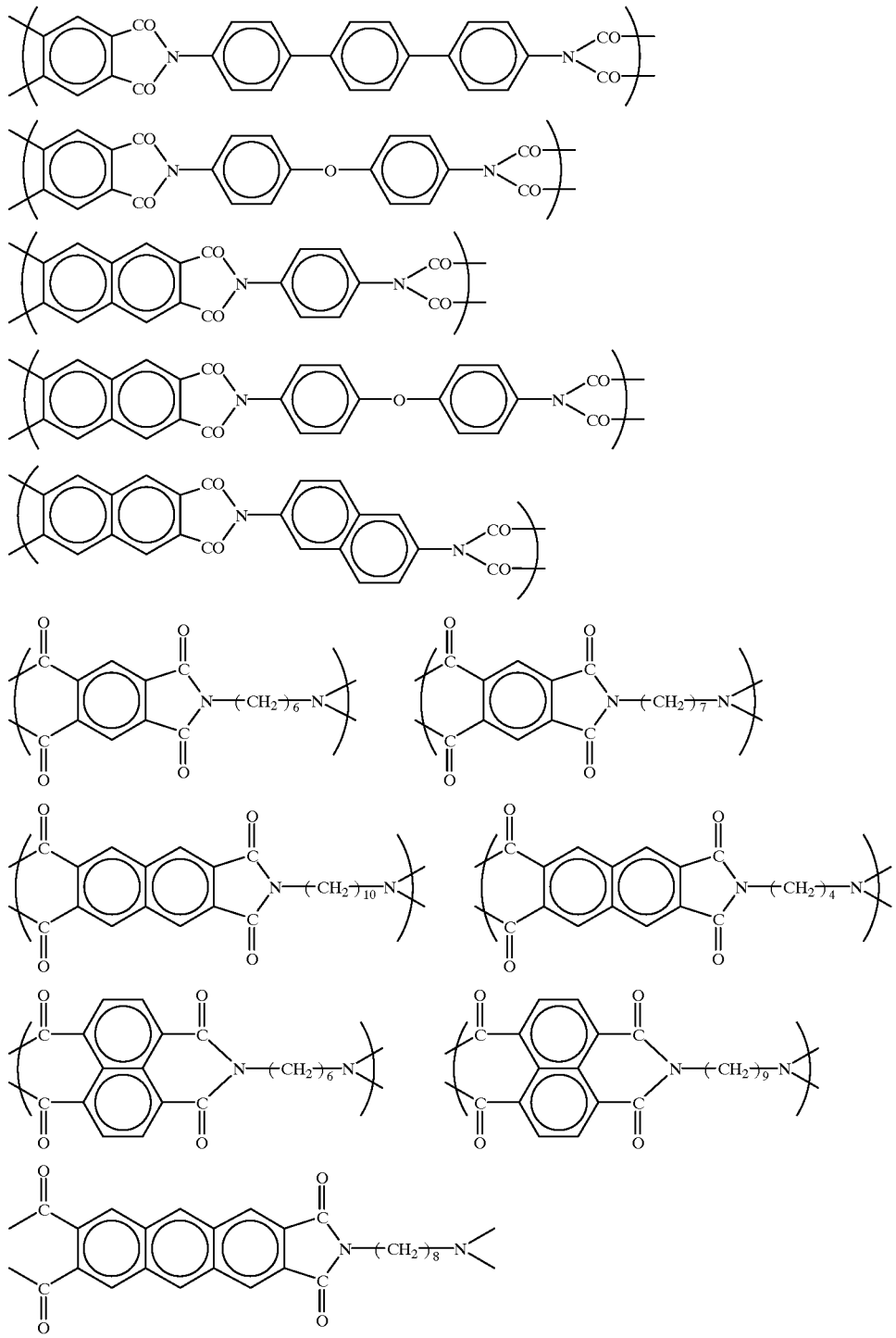

In the liquid crystal device of the present invention, the pair of substrates 1a and 1b are oppositely disposed and applied to each other at a periphery thereof by a sealing agent (not shown in FIG. 1) while keeping a prescribed cell gap by spacer beads (not shown) dispersed within a region surrounded by the sealing agent.

The cell gap of the liquid crystal device may be set to be in the range of about 1–5 μm in the case of using a ferroelectric liquid crystal as the liquid crystal material 5. In addition to the spacer beads, adhesive beads may be dispersed between the substrates in order to enhance an adhesiveness therebetween.

The liquid crystal material 5 used is a smectic, preferably a chiral smectic,liquid crystal having a layer spacing-increasing characteristic on temperature decrease in SmA phase. In this respect, it is also possible to use an antiferroelectric liquid crystal having the similar characteristic. In the present invention, the liquid crystal material 5 may preferably has a property such that its layer spacing increases on temperature decrease in SmA phase by 1–10%.

Further, the liquid crystal material 5 may more preferably have no cholesteric phase. In the case where such a cholesteric phase-less liquid crystal is used, batonnets are gradually generated to form an alignment or orientation state during a phase transition from isotropic phase to smectic phase. In this case, if the cell (device) structure is constituted by using the combination of different alignment control layers as mentioned above, the batonnets start to generate from one substrate side and glow toward the other substrate side, thus being liable to realize a uniform alignment state of liquid crystal molecules.

In the liquid crystal devices of the present invention, the liquid crystal material 5 may preferably comprise a chiral smectic liquid crystal composition.

The chiral smectic liquid crystal composition may desirably contain at least one species of a fluorine-containing mesomorphic compound which preferably has a structure including a fluorocarbon terminal portion and a hydrocarbon terminal portion connected by a central core and has smectic phase or latent smectic phase. The term "latent smectic phase" refers to a property of a compound concerned that the compound alone does not exhibit smectic phase but can be a component compatibly contained in smectic phase of a liquid crystal composition.

In the fluorine-containing mesomorphic compound used in the present invention, the mesomorphic compound may preferably have a central core comprising at least two rings independently selected from aromatic, heteroaromatic, cycloaliphatic, substituted aromatic, substituted heteroaromatic, or substituted cycloaliphatic rings, which may be connected one with another by means of functional groups selected from —COO—, —COS—, —HC=N—, —COSe—. Rings may be fused or non-fused. Heteroatoms within the heteroaromatic ring comprise at least one atom selected from N, O or S. Non-adjacent methylene groups in cycloaliphatic rings may be substituted by O atom.

In a preferred class of the fluorine-containing mesomorphic compound, the fluorocarbon terminal portion may preferably be:

a group represented by the formula —$D^1$—$C_{xa}F_{2xa}$—X, where xa is 1–20; X is —H or —F; —$D^1$— is —CO—O—$(CH_2)_{ra}$—, —O—$(CH_2)_{ra}$—, —$(CH_2)_{ra}$—, —O—$SO_2$—, —$SO_2$—, —$SO_2$-$(CH_2)_{ra}$—, —O—$(CH_2)_{ra}$—O—$(CH_2)_{rb}$—, —$(CH_2)_{ra}$—$N(C_{pa}H_{2pa+1})$—$SO_2$— or —$(CH_2)_{ra}$—$N(C_{pa}H_{2pa+1})$—CO—; where ra and rb are independently 1–20; and pa is 0–4; or a group represented by —$D^2$—$(C_{xb}F_{2xb}$—$O)_{za}$—$C_{ya}F_{2ya+1}$, wherein xb is 1–10 independently for each ($C_{xb}F_{2xb}$—O); ya is 1–10; za is 1–10; —$D^2$— is —CO—O—$C_{rc}H_{2rc}$—, —O—$C_{rc}H_{2rc}$——$C_{rc}H_{2rc}$—, —O—$(C_{sa}H_{2sa}$—$O)_{ta}$—$C_{rd}H_{2rd}$—, —O—$SO_2$—, —$SO_2$—, —$SO_2$—$C_{rc}H_{2rc}$—, —$C_{rc}H_{2rc}$—N$(C_{pb}H_{2pb+1})$—$SO_2$—, —$C_{rc}H_{2rc}$—$N(C_{pb}H_{2pb+1})$—CO—, or a covalent bond, where rc and rd are independently 1–20; sa is independently 1–10 for each ($C_{sa}H_{2sa}$—O); ta is 1–6; and pb is 0–4.

It is particularly preferred to use a fluorine-containing mesomorphic compound of the following general formula (I) or general formula Formula (I):

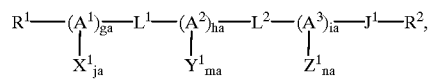

wherein $A^1$, $A^2$ and $A^3$ are each independently

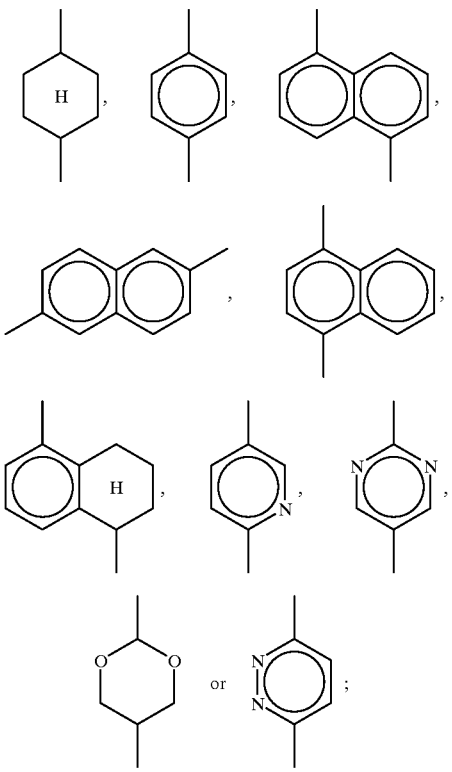

ga, ha and ia are independently an integer of 0–3 with the proviso that the sum of ga+ha+ia be at least 2;

$L^1$ and $L^2$ are each independently a covalent bond, —CO—O—, —O—CO—, —COS—, —S—CO—, —CO—Se—, —Se—CO—, —CO—Te—, —Te—CO—, —$CH_2CH_2$—, —CH=CH—, —C≡C—, —CH=N—, —N=CH—, —$CH_2$—O—, —O—$CH_2$—, —CO— or —O—;

$X^1$, $Y^1$ and $Z^1$ are each a substituent of A $A^2$ and $A^3$, respectively, and each $X^1$, $Y^1$ and $Z^1$ are independently —H, —Cl, —F, —Br, —I, —OH, —$OCH_3$, —$CH_3$, —CN or —$NO_2$;

each ja, ma and na are independently an integer of 0–4;

$J^1$ is —CO—O—$(CH_2)_{ra}$—, —O—$(CH_2)_{ra}$—, —$(CH_2)_{ra}$—, —O—$SO_2$—, —$SO_2$—, —$SO_2$—$(CH_2)_{ra}$—, —O—$(CH_2)_{ra}$O—$(CH_2)_{rb}$—, —$(CH_2)_{ra}$—$N(C_{pa}H_{2pa+1})$—$SO_2$— or —$(CH_2)_{ra}$—N$(C_{pa}H_{2pa+1})$—CO—; where ra and rb are independently 1–20, and pa is 0–4;

$R^1$ is —O—$C_{qa}H_{2qa}$—O—$C_{qb}H_{2qb+1}$, —$C_{qa}H_{2qa}$—O—$C_{qb}H_{2qb+1}$, —$C_{qa}H_{2qa}$—$R^3$, —O—$C_{qa}H_{21qa}$—R, —CO—O—$C_{qa}H_{2qa}$—$R^3$, or —O—CO—C $H_{2qa}$—$R^3$ which may be either straight chain or branched; where $R^3$ is —O—CO—C $H_{2qb+1}$, —CO—O—$C_{qb}H_{2qb+1}$, —H, —Cl, —F, —$CF_3$, —$NO_2$ or —CN; and qa and qb are independently 1–20;

$R^2$ is $C_{xa}F_{2xa}$—X, where X is —H or —F, xa is an integer of 1–20.

Formula (II):

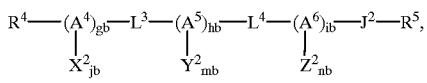

wherein $A^4$, $A^5$ and $A^6$ are each independently

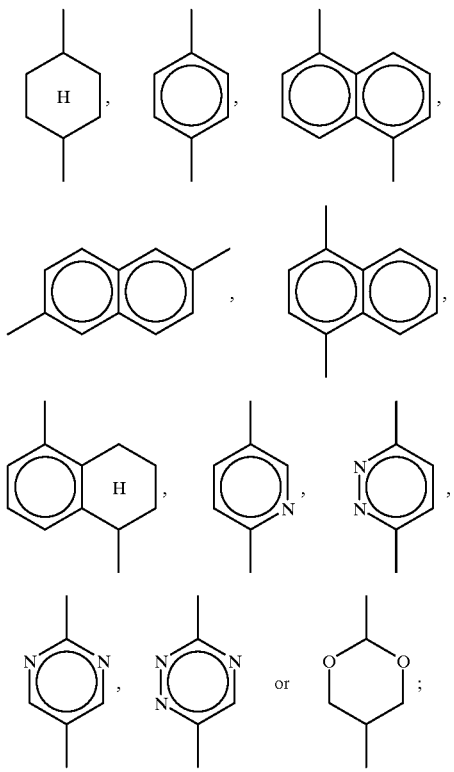

gb, hb and ib are each independently an integer of 0–3 with the proviso that the sum of gb+hb+ib be at least 2;

each $L^3$ and $L^4$ are independently a covalent bond, —CO—O—, —O—CO—, —CO—S—, —S—CO—, —CO—Se—, —Se—CO—, —CO—Te—, —Te—CO—, —(CH$_2$CH$_2$)$_{ka}$— (ka is 1–4), —CH=CH—, —C≡C—, —CH=N—, —N=CH—, —CH$_2$—O—, —O—CH$_2$—, —CO— or —O—;

$X^2$, $Y^2$ and $Z^2$ are each a substituent of $A^4$, $A^5$ and $A^6$, respectively, and each $X^2$, $Y^2$ and $Z_2$ are independently —H, —Cl, —F, —Br, —I, —OH, —OCH$_3$, —CH$_3$, —CF$_3$, —O—CF$_3$, —CN or —NO$_2$; each jb, mb and nb are independently an integer of 0–4;

$J^2$ is —CO—O—C$_{rc}$H$_{2rc}$—, —O—C$_{rc}$H$_{2rc}$—, —C$_{rc}$H$_{2rc}$—, —O—(C$_{sa}$H$_{2sa}$—O)$_{ta}$—C$_{rd}$H$_{2rd}$—, —O—SO$_2$—, —SO$_2$—, —SO$_2$—C$_{rc}$H$_{2rc}$—, —C$_{rc}$H$_{2rc}$—N(C$_{pb}$H$_{2pb+1}$)—SO$_2$— or —C$_{rc}$H$_{2rc}$—N(C$_{pb}$H$_{2pb+1}$)—CO—; rc and rd are independently 1–20; sa is independently 1–10 for each (C$_{sa}$H$_{2sa}$—O), ta is 1–6; pb is 0–4;

$R^4$ is —O—(C$_{qc}$H$_{2qc}$—O)$_{wa}$—C$_{qd}$H$_{2qd+1}$, —(C$_{qc}$H$_{2qc}$—O)$_{wa}$—C$_{qd}$H$_{2qd+1}$, —C$_{qc}$H$_{2qc}$—R$^6$, —C$_{qc}$H$_{2qc}$R$^6$, —CO—O—C$_{qc}$H$_{2qc}$—R$^6$, or O—CO—C$_{qc}$H$_{2qc}$—R$^6$ which may be either straight chain or branched; $R^6$ is —O—CO—C$_{qd}$H$_{2qd+1}$; —CO—O—C$_{qd}$H$_{2qd+1}$, —Cl, —F, —CF$_3$, —NO$_2$, —CN or —H; qc and qd are independently an integer of 1–20; wa is an integer of 1–10;

$R^5$ is (C$_{xb}$F$_{2xb}$—O)$_{za}$—C$_{ya}$F$_{2ya+1}$, wherein xb is independently 1–10 for each (C$_{xb}$F$_{2xb}$—O); ya is 1–10; and za is 1–10.

The compounds represented by the general formula (I) may be obtained through a process described in U.S. Pat. No. 5,082,587 (corr. to JP-A 2-142753). Specific examples thereof are enumerated below.

I-1
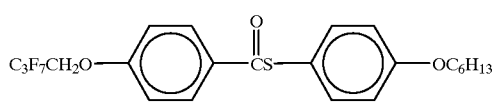

I-2
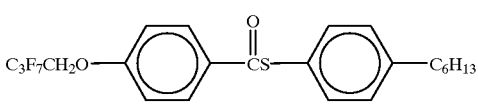

I-3
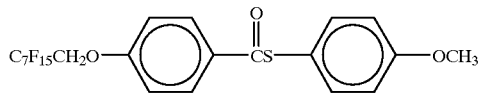

I-4
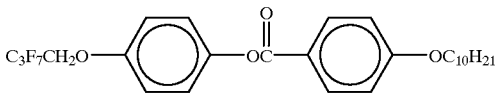

I-5
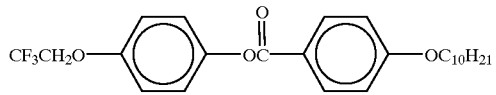

I-6
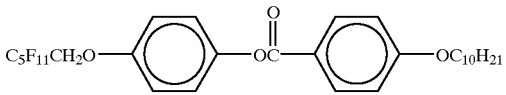

I-7
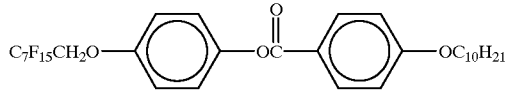

I-8
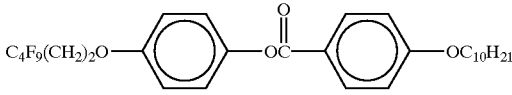

I-9
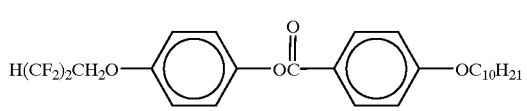

I-10
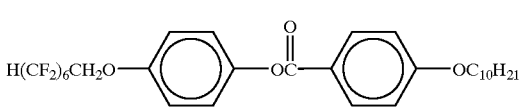

-continued
I-11
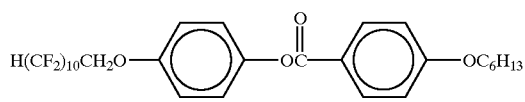
I-12
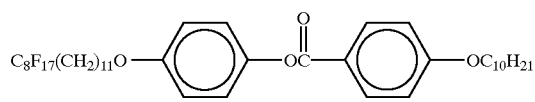
I-13
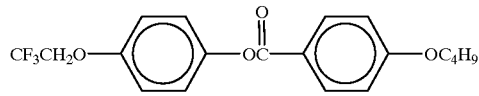
I-14
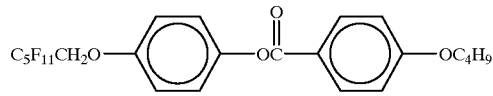
I-15
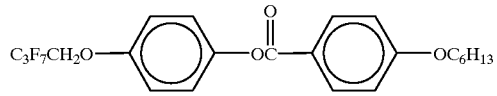
I-16
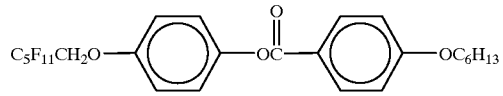
I-17
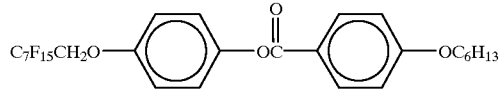
I-18
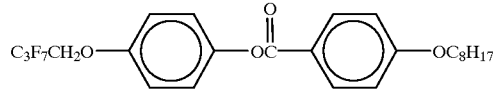
I-19
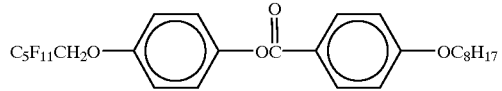
I-20
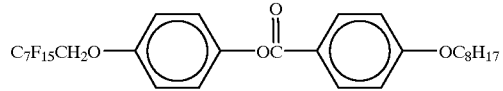
I-21
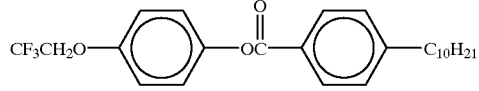
I-22
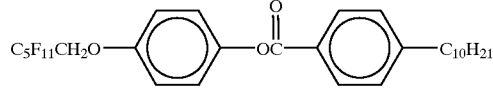
I-23
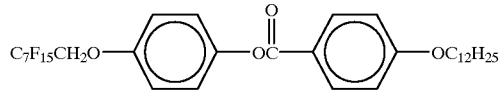
I-24
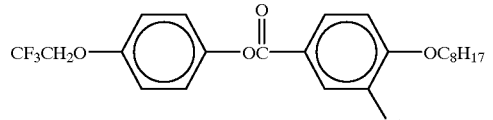
I-25
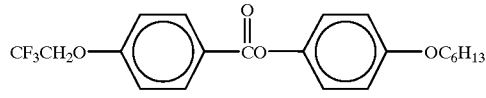
I-26
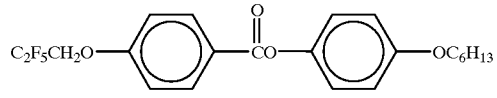
I-27
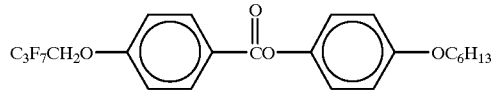
I-28
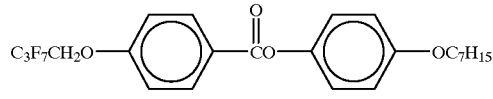
I-29
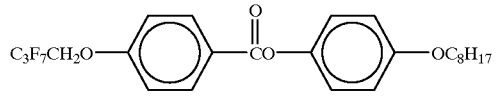
I-30
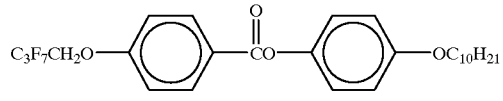
I-31
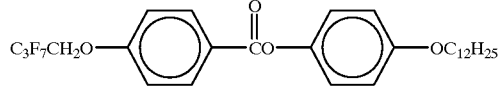
I-32
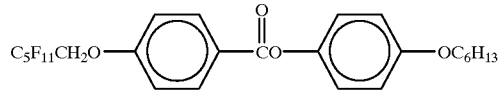
I-33
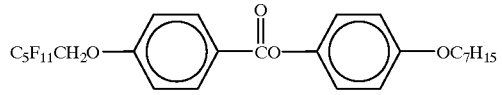
I-34
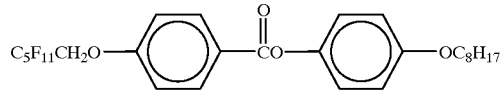
I-35
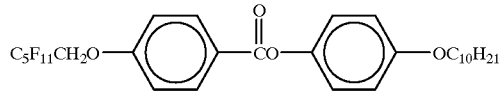
I-36
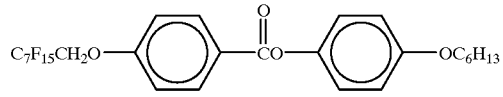

-continued
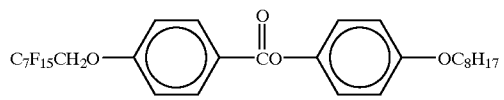 I-37
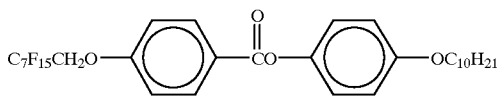 I-38
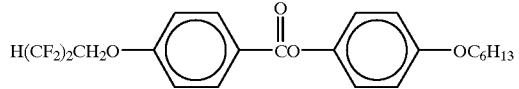 I-39
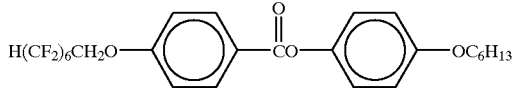 I-40
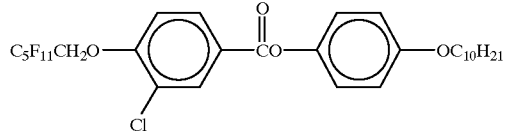 I-41
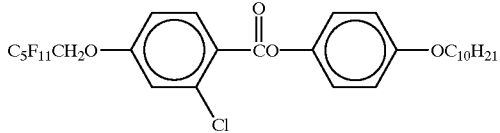 I-42
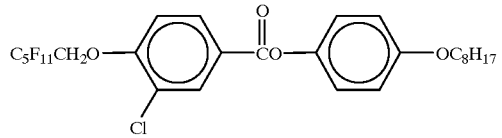 I-43
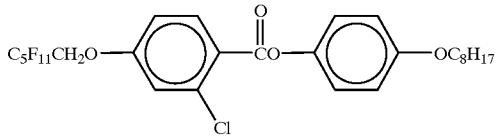 I-44
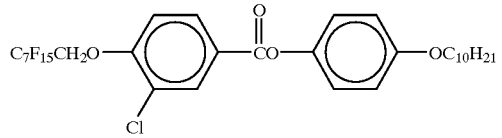 I-45
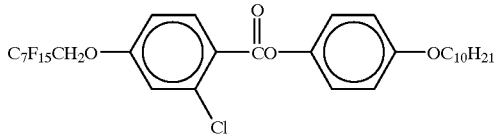 I-46
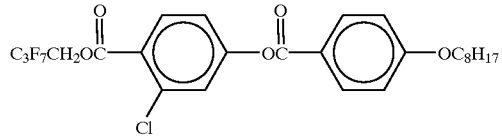 I-47
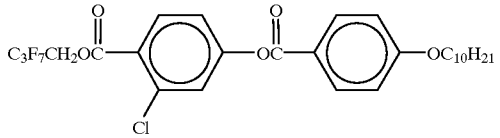 I-48
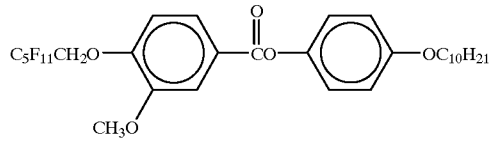 I-49
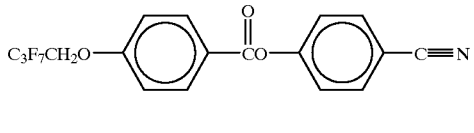 I-50
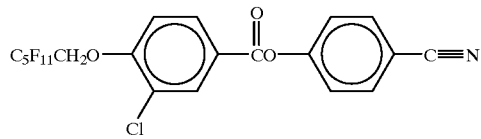 I-51
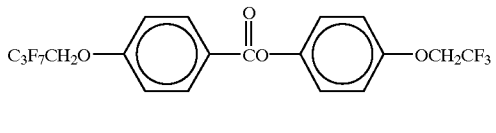 I-52
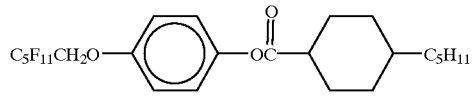 I-53
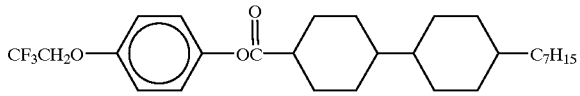 I-54
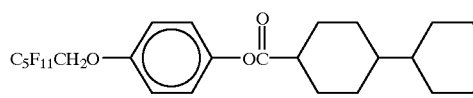 I-55
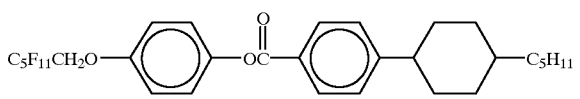 I-56

-continued
I-57
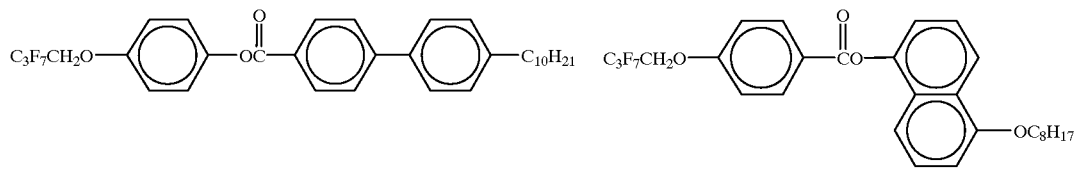
I-58
I-59
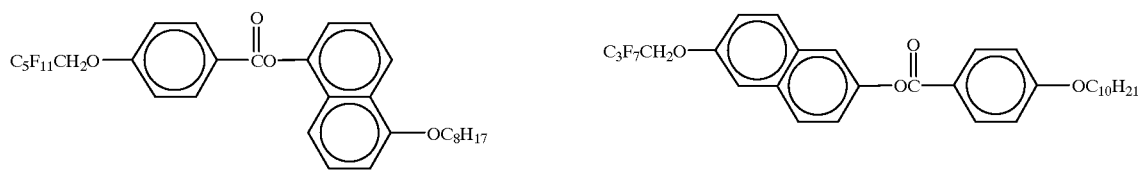
I-60
I-61
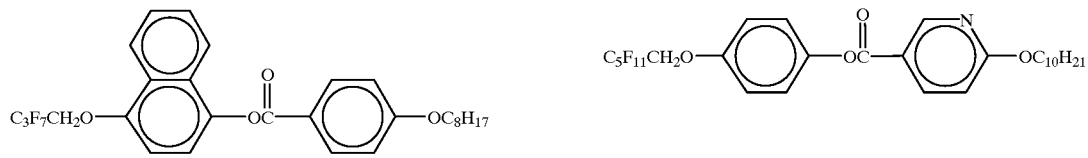
I-62
I-63
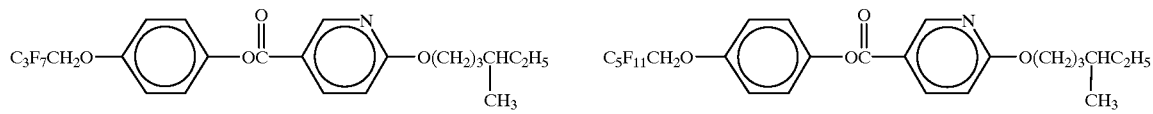
I-64
I-65
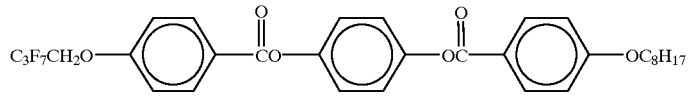
I-66
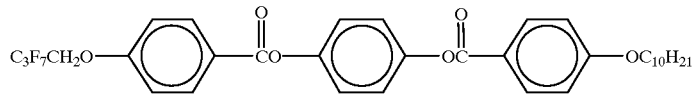
I-67
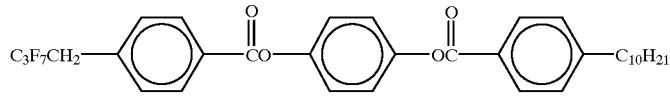
I-68
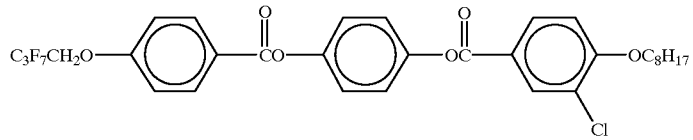
I-69
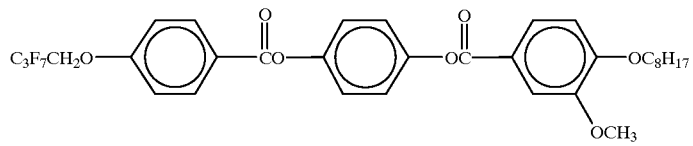
I-70
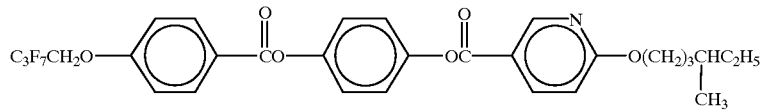

-continued
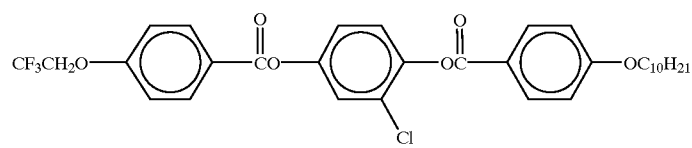
I-71
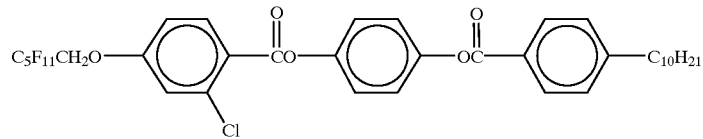
I-72
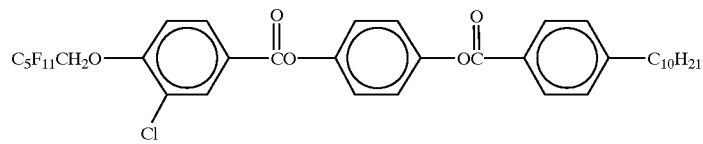
I-73
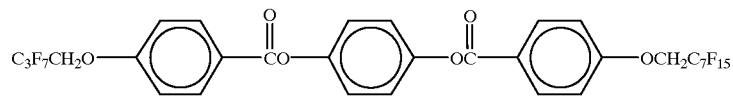
I-74
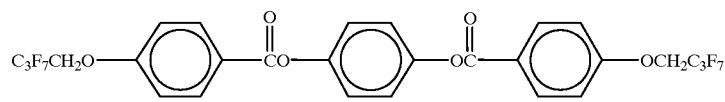
I-75
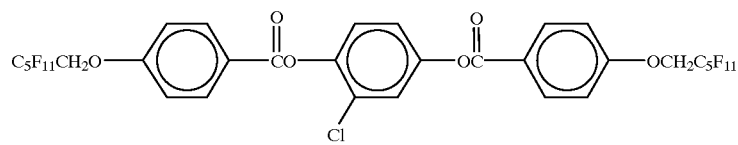
I-76
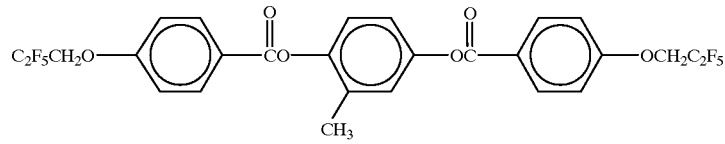
I-77
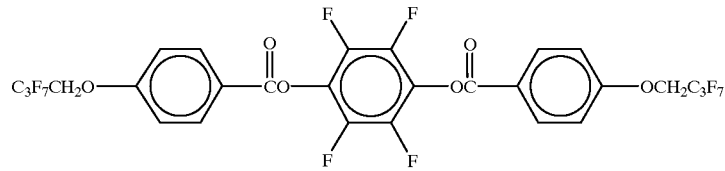
I-78
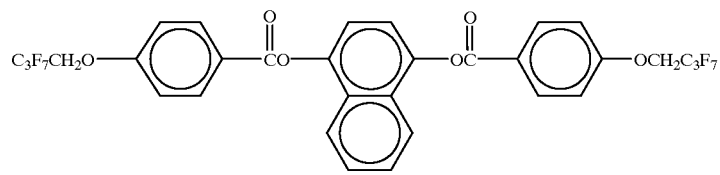
I-79
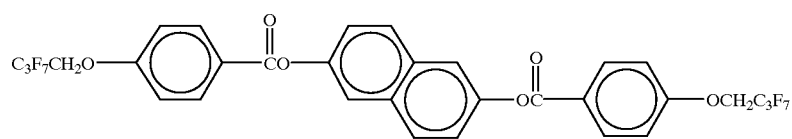
I-80

-continued
I-81
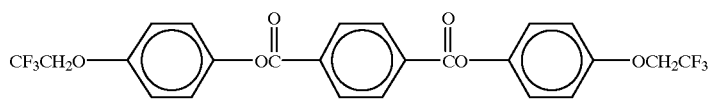
I-82
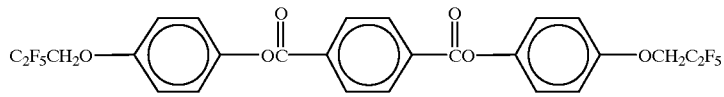
I-83
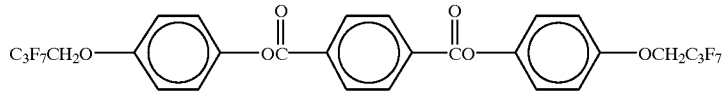
I-84
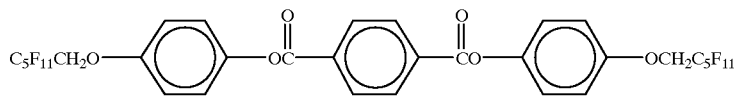
I-85
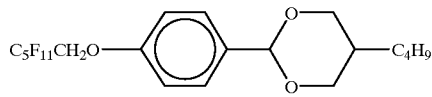
I-86
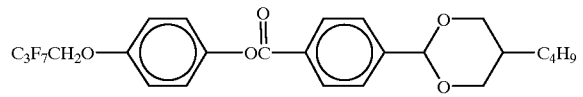
I-87
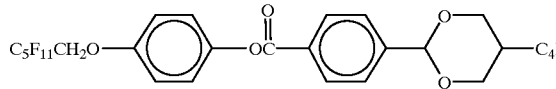
I-88
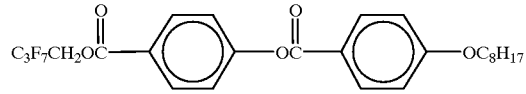
I-89
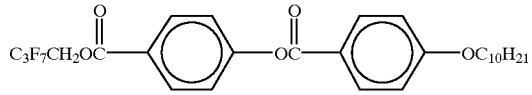
I-90
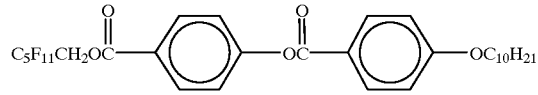
I-91
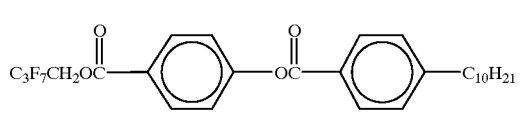
I-92
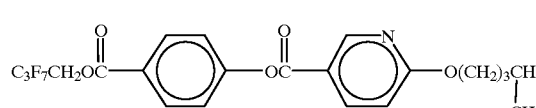
I-93
I-94
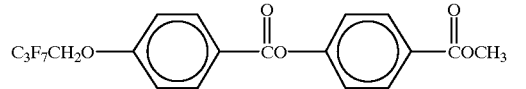
I-95
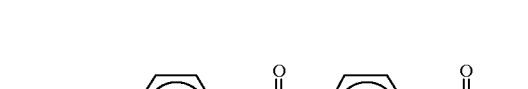
I-96
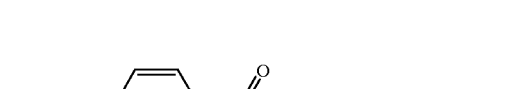
I-97
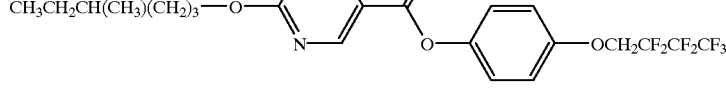

-continued
I-98
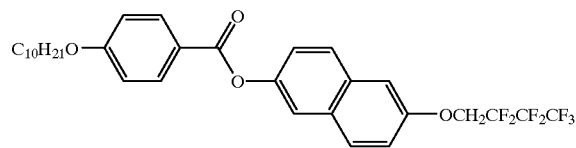
I-99
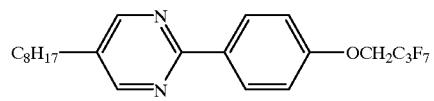
I-100
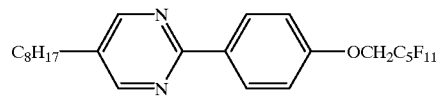
I-101
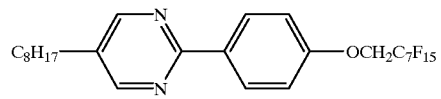
I-102
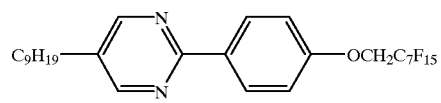
I-103
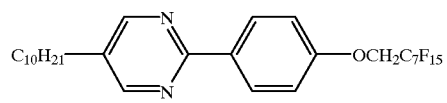
The compounds represented by the general formula (II) may be obtained though a process described in PCT Publication WO93/22396 (corr. to JP (Tokuhyo) 7-506368). Specific examples thereof are enumerated below.
II-1
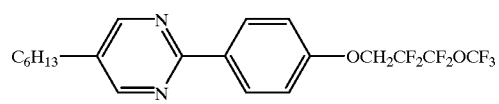
II-2
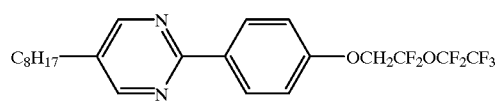
II-3
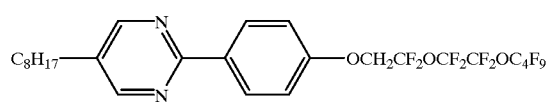
II-4
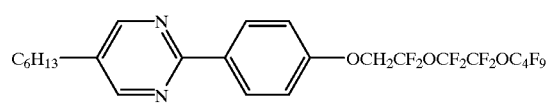
II-5
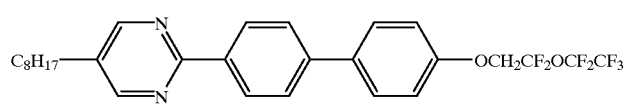
II-6
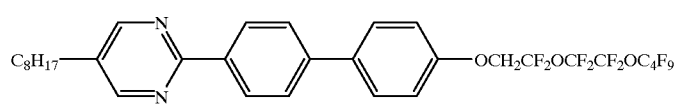
II-7
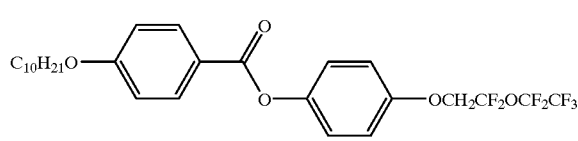

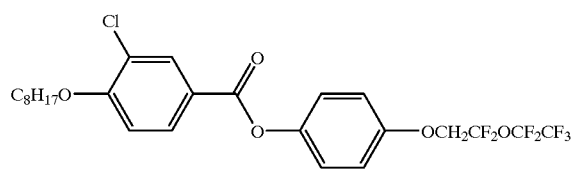
II-8
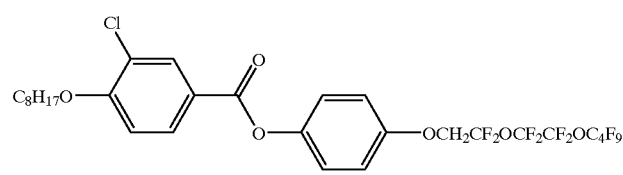
II-9
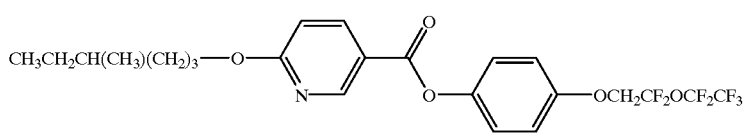
II-10
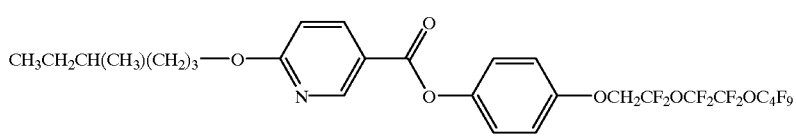
II-11
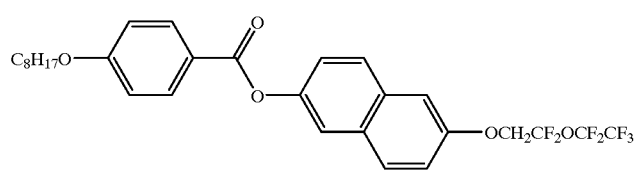
II-12
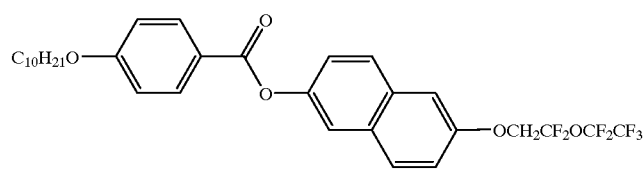
II-13
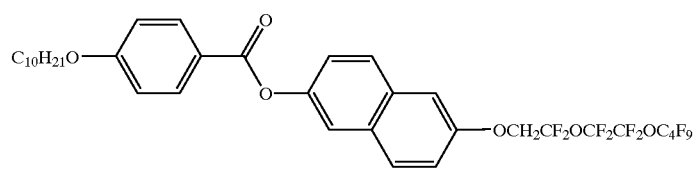
II-14
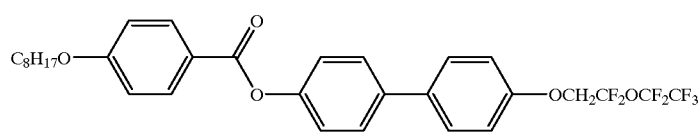
II-15
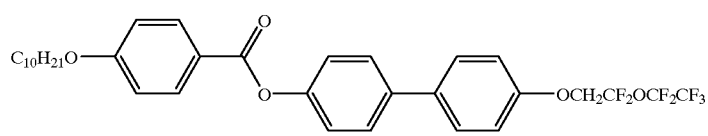
II-16

-continued
II-17
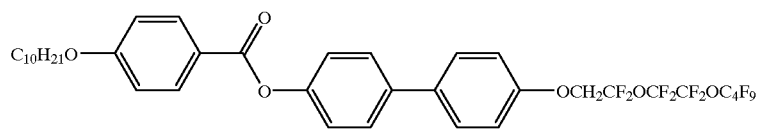
II-18
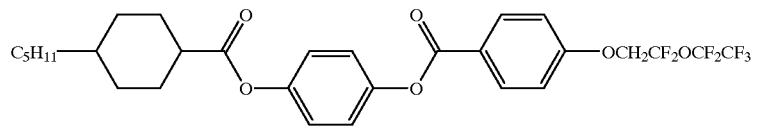
II-19
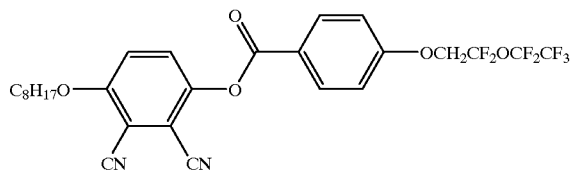
II-20
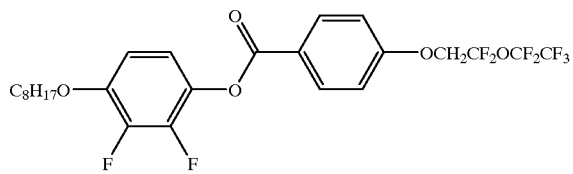
II-21
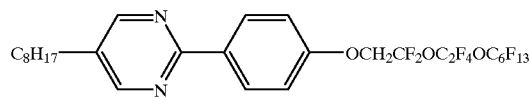
II-22
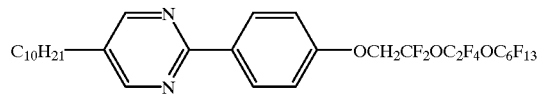
II-23
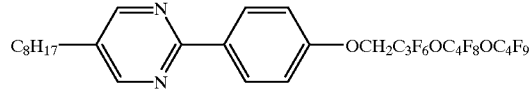
II-24
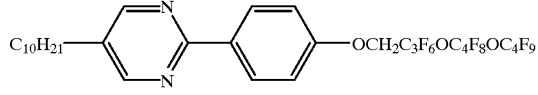
II-25
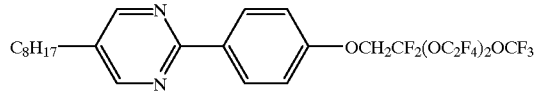
II-26
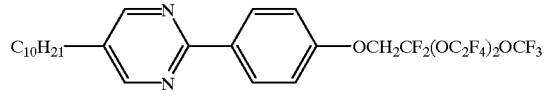
II-27
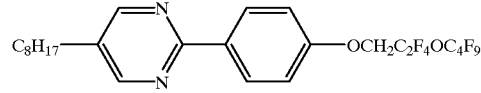

-continued
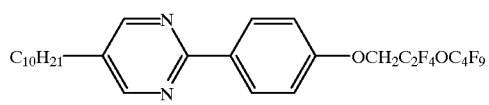 II-28
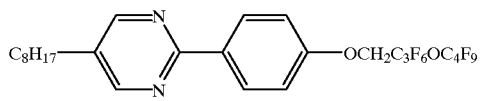 II-29
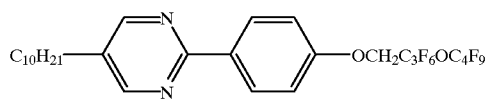 II-30
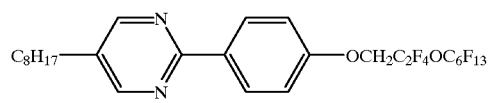 II-31
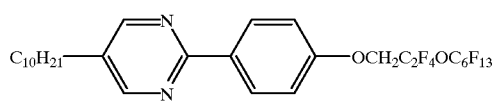 II-32
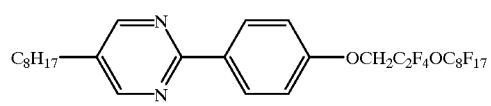 II-33
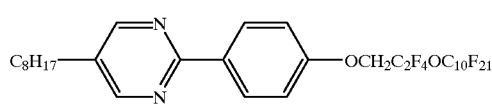 II-34
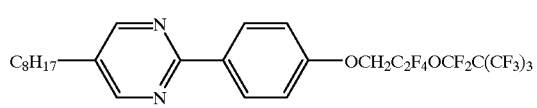 II-35
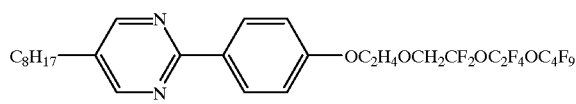 II-36
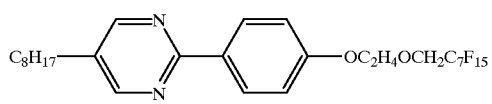 II-37
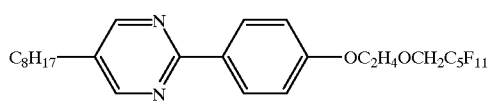 II-38
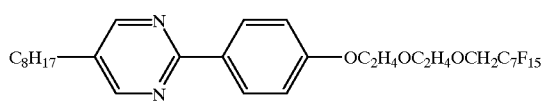 II-39

-continued

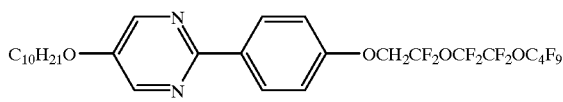

II-40

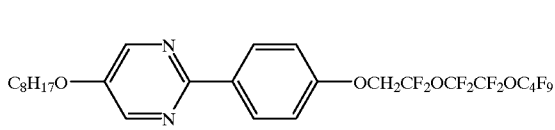

II-41

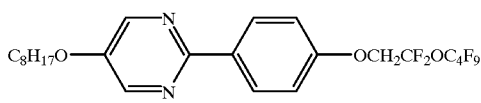

II-42

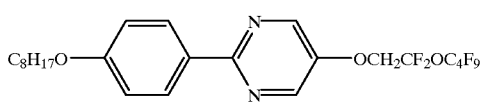

II-43

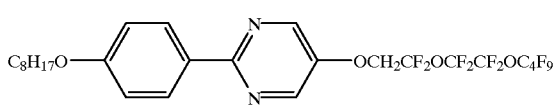

II-44

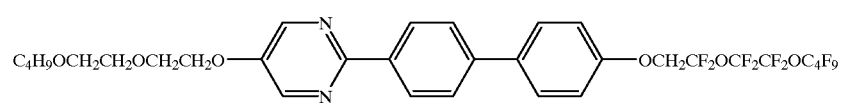

II-45

The chiral smectic liquid crystal composition used in the present invention generally further contains at least one species of an optically active (chiral) compound preferably having a chained or cyclic optically active cite. The optically active compound may appropriately be selected in view of mutual solubility or compatibility with the fluorine-containing mesomorphic compound used in the present invention.

The chiral smectic liquid crystal (composition) used in the invention may further contain additives such as an antioxidant, an ultraviolet ray-absorbing agent, dyes and pigments.

The structure of the liquid crystal device used in the present invention may appropriately be modified into those of a conventional liquid crystal device using a chiral smectic liquid crystal.

In the present invention, it is possible to use, as one electrode plate, an active matrix substrate provided with a plurality of switching elements (e.g., TFT (thin film transistor) or MIM (metal-insulator-metal)). Particularly, it is also possible to provide a liquid crystal apparatus for effecting an active matrix driving by appropriately selecting and controlling the liquid crystal material 5 and other device constituting elements (or members) and effecting a switching of liquid crystal molecules in a non-memory state depending on a magnitude and polarity of an applied voltage in combination with a driving circuit (driving means) for supplying a gradation signal to the liquid crystal device used.

Hereinbelow, such a liquid crystal apparatus using an active matrix-type liquid crystal device and a drive means will be explained with reference to FIGS. 11 and 12.

The liquid crystal apparatus is generally constituted by a liquid crystal device (panel portion), which includes a liquid crystal material disposed between an active matrix substrate provided with a plurality of switching elements and a plurality of pixel electrodes and a substrate provided with a plurality of common electrodes, and a drive means for driving the liquid crystal device.

Figure 11:
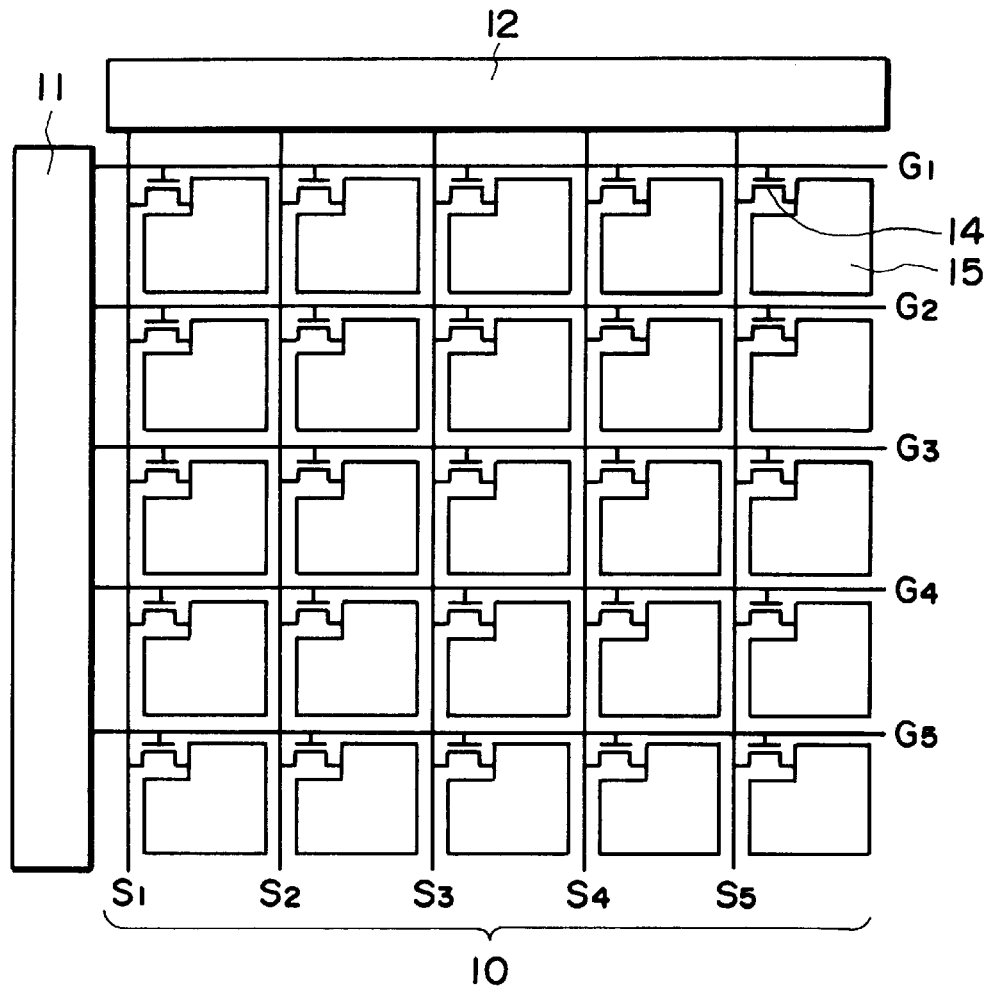
FIG. 11 is a schematic plan view of an embodiment of an active matrix-type liquid crystal device and a driving means therefor.

FIG. 11 shows a schematic plan view of such a liquid crystal apparatus and principally illustrates a structure of the active matrix substrate side.

Referring to FIG. 11, a liquid crystal device (panel) 10 includes a structure such that gate lines (G1, G2, G3, G4, G5, . . . ) corresponding to scanning lines connected to a scanning signal driver 11 (drive means) and source lines (S1, S2, S3, S4, S5, . . . ) corresponding to data signal lines connected to a data signal device (drive means) are disposed to intersect each other at right angles in an electrically isolated state, thus forming a plurality of pixels (5×5 in FIG. 11) each at intersection thereof. Each pixel is provided with a thin film transistor (TFT) 14 as a switching element and a pixel electrode 15. The switching element may be a metal-insulator-metal (MIM) element. The gate lines (G1, G2, . . . ) are connected with gate electrodes (not shown) of the TFT 14, respectively, and the source lines (S1, S2, . . . ) are connected with source electrodes (not shown) of the TFT 14, respectively. The pixel electrodes 15 are connected with drain electrodes (not shown) of the TFT 14, respectively.

A gate voltage is supplied to the gate lines (G1, G2, . . . ) from the scanning signal driver 11 by effecting scanning selection in, e.g., a line-sequential manner. In synchronism with this scanning selection on the gate lines, the source lines (S1, S2, . . . ) are supplied with a data signal voltage depending on writing data for each pixel from the data signal driver 12. The thus-supplied gate and data signal voltages are applied to each pixel electrode 15 via the TFT 14.

Figure 12:
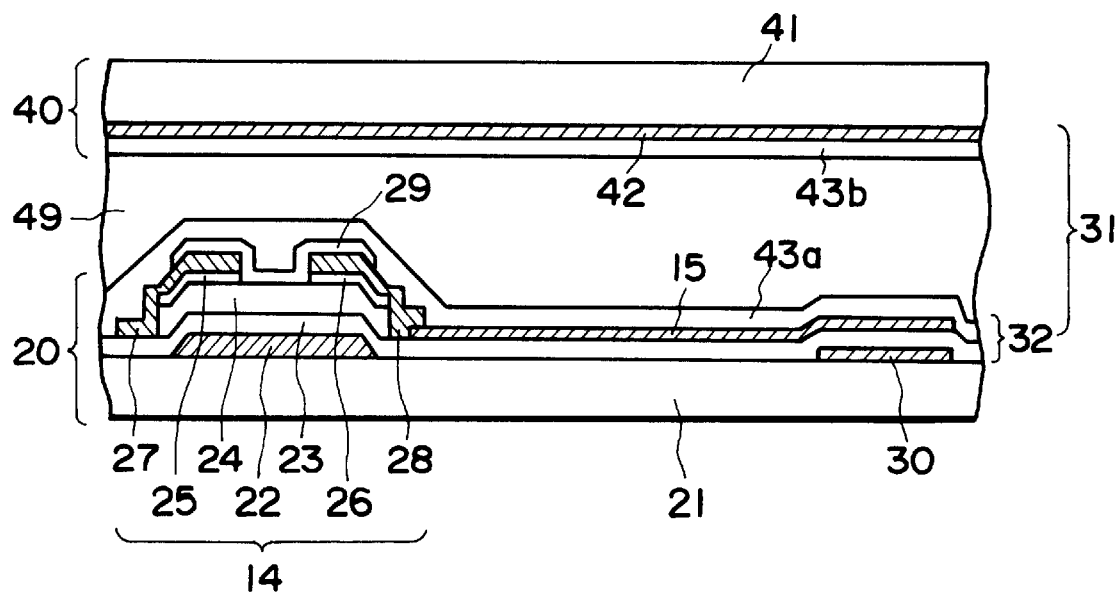
FIG. 12 is a schematic sectional view of an embodiment of each pixel of the active matrix-type liquid crystal device shown in FIG. 11.

FIG. 12 shows a sectional structure of each pixel portion (corr. to 1 bit) in the panel structure shown in FIG. 11.

Referring to FIG. 12, a layer of a liquid crystal material 49 having a spontaneous polarization are sandwiched between an active matrix substrate or plate (electrode plate) 20 provided with a TFT 14 and a pixel electrode 15 and an opposing substrate or plate (electrode plate) 40 provided with a common electrode 42, thus providing a (liquid crystal) capacitor (Clc) of the liquid crystal layer.

In this embodiment, the active matrix substrate 20 includes an amorphous silicon (a-Si) TFT as the TFT 14. The TFT may be of a poly-Si type or of other types, such as a switching element of two-terminal type.

The TFT 14 is formed on a substrate 21 of, e.g., glass and includes: a gate electrode 22 connected with the gate lines (G1, G2, . . . shown in FIG. 11); an insulating film (gate insulating film) 23 formed on the gate electrode 22; an a-Si TFT 24 formed on the insulating film 23; $n^+$ a-Si TFTs 25 and 26 formed on the a-Si TFT 24 and spaced apart from each other; a source electrode 27 formed on the $n^+$ a-Si TFT 25; a drain electrode 28 formed on the $n^+$ a-Si TFT 26 and spaced apart from the source electrode 27; a channel protective film 29 partially covering the a-Si TFT 24 and the source and drain electrodes 27 and 28. The source electrode 27 is connected with the source lines (S1, S2, . . . shown in FIG. 11) and the drain electrode 28 is connected with the pixel electrode 15 (FIG. 11) of a transparent conductor film (e.g., ITO film). The TFT 14 is placed in an "ON" state by applying a gate pulse to the gate electrode 22 during a scanning selection period of the corresponding gate line.

Further, on the active matrix substrate 20, a structure constituting a holding capacitor (Cs) 32 is formed by the pixel electrode 15, a holding capacitor electrode 30 disposed on the substrate 21, and the insulating film 23 (extended continuously from the TFT portion) sandwiched between the electrodes 15 and 30. The structure (holding capacitor) (Cs) 32 is disposed in parallel with the liquid crystal layer 49. In the case where the holding capacitor electrode 30 has a large area, a resultant opening rate is decreased. In such a case, the holding capacitor electrode 30 is formed of a transparent conductor film (e.g., ITO film).

On the TFT 14 and the pixel electrode 15 of the active matrix substrate 20, an alignment control layer 43$a$ for controlling an alignment state of the liquid crystal 49.

On the other hand, the opposing substrate 40 includes a substrate (e.g., glass substrate) 41; a common electrode 42 disposed on the substrate 41; and an alignment control layer 43$b$, disposed on the common electrode 42, for controlling an alignment state of he liquid crystal 40.

The alignment control layers 43$a$ and 43$b$ may be formed and treated similarly as in the case of the alignment control layers 3 and 4 (shown in FIG. 1) as described above.

The cell structure (liquid crystal device) including a plurality of the pixels each having the structure shown in FIG. 12 is sandwiched between a pair of polarizers (not shown) with polarizing axes intersecting each other at right angles. Further, other elements or members (e.g., spacer beads, adhesive beads) constituting the cell structure may be those used for that shown in FIG. 1.

The liquid crystal layer 49 comprises a liquid crystal material identical to those described for the liquid crystal layer 5 (FIG. 1), including a ferroelectric liquid crystal and an antiferroelectric liquid crystal each having chiral smectic phase. By using such a liquid crystal material 49 and controlling, e.g., a driving waveform for active matrix display, it is also possible to effect a gradation display.

In the aligning method of a chiral smectic liquid crystal according to the present invention, the following sequential heat treatment may be conducted to the chiral smectic liquid crystal after the liquid crystal heated up to a higher temperature phase (generally isotropic (Iso.) phase) is injected into the above-described cell structure. The heat treatment is also applicable to the liquid crystal panel in the higher temperature phase (Iso. phase) after the liquid crystal is cooled to a room temperature and then is heated again to the higher temperature phase.

More specifically, in smectic A (SmA) phase, an upper limit and a lower limit of a (second) temperature range are set so as to include at least a portion of a (first) temperature range in which a smectic layer spacing increases on temperature decrease. This (first) temperature range generally well coincides with a temperature range of SmA phase in many cases.

The (chiral smectic) liquid crystal is cooled from the higher temperature (Iso.) phase to the lower limit of the second temperature range. Thereafter, at least one cycle (cycle treatment) of heating from the lower limit to the upper limit (of the second temperature range) and cooling the upper limit to the lower limit is performed, followed by cooling from the lower limit to chiral smectic (SmC* or SmC$_A$*) phase.

In a preferred embodiment, either one or both of the heating and cooling steps between the lower and upper limits of the second temperature range (particularly the heating step) for each cycle are performed in a portion of the first temperature range wherein the layer spacing changes with temperature change by 1–10%.

The second temperature range or a difference between the upper and lower limits (in which at least one cycle of the heating and cooling steps is performed) may preferably be at least 15° C.

The upper limit of the second temperature range may preferably be set in a range lower than an Iso.→SmA phase transition temperature by 0.5–10° C. in view of the effect of alignment control and an operability for the cycle temperature.

From the similar viewpoint, the lower limit may preferably be set in a range higher that an SmAI→SmC* (SmC$_A$*) phase transition temperature.

Each of the rates of heating and cooling in the cycle treatment may desirably be set in a range of 0.1–10° C./min.

In the (final) cooling step from the lower limit (in SmA phase) to a smectic phase lower than SmA phase (generally chiral smectic (SmC* or SmC$_A$*) phase), it is possible to obtain a further uniform alignment state by applying a voltage to the liquid crystal in SmC* or SmC$_A$* phase. The voltage may preferably comprise an alternating electric field (rectangular or triangular waveform) of 0.1–100 Hz and 0.1–10 volts.

In the present invention, the smectic layer structure and its characteristic are analyzed according to an X-ray diffraction method.

First, the layer spacings d and the layer inclination angle δ were measured in basically smaller manner to the method used by Clark and Lagerwall (Japan Display '86, Sept. 30–Oct. 2, 1986, p.p. 456–458). The measurement was performed by using an X-ray diffraction apparatus (available from MAC Science having a rotary cathode-type X-ray generating unit) provided with an automatic temperature controller, and an 80 μm-thick glass sheet ("Microsheet", available from Corning Glass Works) was used as a substrate so as to minimize the heat capacity and the X-ray absorption by the glass substrate.

More specifically, for measurement of the layer spacing d, a sample (bulk) liquid crystal (liquid crystal composition to be filled in a cell) was applied in a 5 mm-square size so as to form a flat surface on the 80 μm-thick glass sheet and, while being temperature-controlled by a temperature-controlling plate and a temperature-monitoring thermocouple, irradiated with X-rays from a rotary X-ray source, so that the output light including diffraction rays was detected by a detector (counter), similarly as in the ordinary powder X-ray diffraction. An angle providing a peak of X-ray intensity was substituted in the Bragg's formula for diffraction condition to obtain a layer spacing d.

The sample liquid crystal was first brought to its isotropic phase temperature, and the measurement was repeated every 3° C. or every 1° C. (for in the vicinity of an Iso.→SmA transition point while cooling the sample down to a temperature where no diffraction peak was observed. The automatic temperature controller used showed a control accuracy of ±0.3° C. at each measurement temperature.

The measurement was performed by using CuKα-rays (1.54050 Å) at a power of 13.5 KW (45 kV×30 mA) as analyzing rays and using a slit system including a divergent slit of 0.5 degrees, a scanning slit of 0.5 degree and a light-receiving slit of 0.15 mm. The scanning was performed at a rate of 3 deg./min. The X-ray irradiation area was $8.0 \times 1.8 mm^2$ determined by a cell jig and the slit system, and the cell thickness (for measurement) was 2.0 μm. The removal of a background count was performed according to the Sonneveld method.

For the measurement of smectic layer inclination angle δ, a sample liquid crystal filling a sample cell was heated to isotropic phase and then gradually cooled. Then, the X-ray detector was set at the angle 2θ corresponding to the above-mentioned layer spacing d, and the sample cell was subjected to θ-scanning. From the measured values, δ at a prescribed measurement temperature was calculated according to the method described in the above-mentioned reference.

Figure 2:
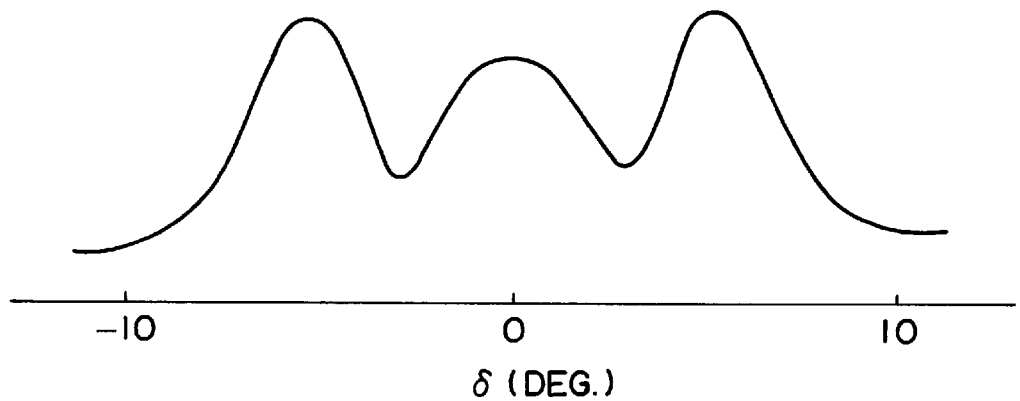
FIG. 2 is a schematic view of an embodiment of an X-ray diffraction pattern showing a smectic layer structure of a chiral smectic liquid crystal through an ordinary heat treatment for alignment.
Figure 3:
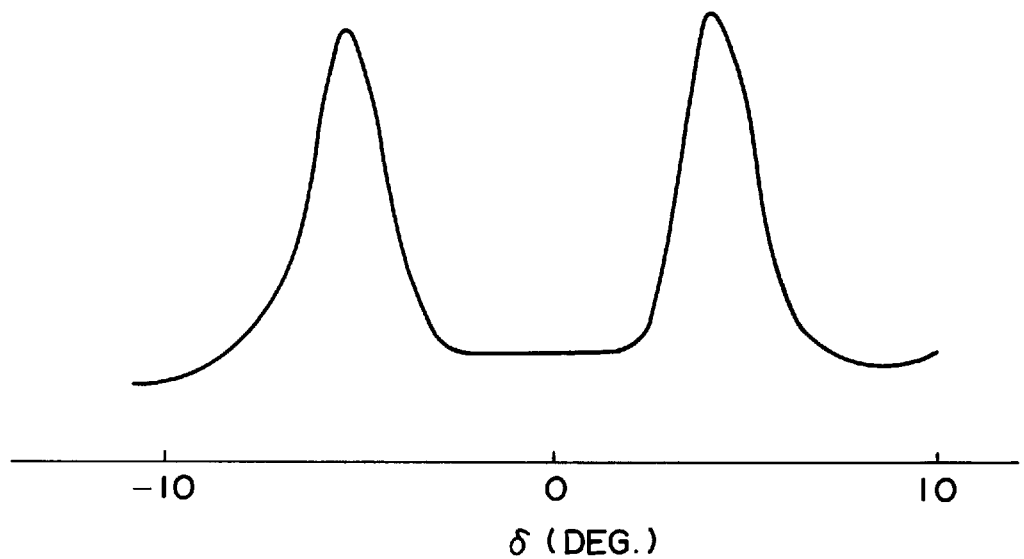
FIG. 3 is a schematic view of an embodiment of an X-ray diffraction pattern showing a smectic layer structure of a chiral smectic liquid crystal subjected to an aligning method according to th present invention.

FIGS. 2 and 3 show X-ray diffraction patterns at 30° C. obtained through the above X-ray diffraction method.

FIG. 2 shows an embodiment of a result of the X-ray diffraction analysis when the sample liquid crystal is subjected to a conventional heat treatment (i.e., gradual cooling from Iso. phase to chiral smectic phase).

On the other hand, FIG. 3 shows an embodiment of a result of the X-ray diffraction analysis when the same sample liquid crystal is subjected to the aligning method (of the present invention) including the above-mentioned heat treatment including a cycle of heating and cooling.

As apparent from FIGS. 2 and 3, the smectic layer structure obtained through the conventional heat treatment (gradual cooling only) includes a co-present state of a bookshelf structure having a layer inclination angle δ of about zero degrees (one peak) and a chevron structure having a δ of about 5–6 degrees (two peaks). The smectic layer structure obtained through the heat treatment (used in the present invention) include only a chevron structure having a δ of about 5–6 degrees (two peaks), thus not having a bookshelf structure. Further, the X-ray diffraction peaks of FIG. 3 are sharper than those of FIG. 2.

Accordingly, it has been found that the smectic layer structure obtained through the aligning method of the present invention provides a less distribution of δ than that obtained through only the conventional gradual cooling, thus resulting in a uniformized layer structure.

The liquid crystal device according to the present invention is used as a display element (medium), for various liquid crystal apparatus, one embodiment of which is described below.

Figure 4:
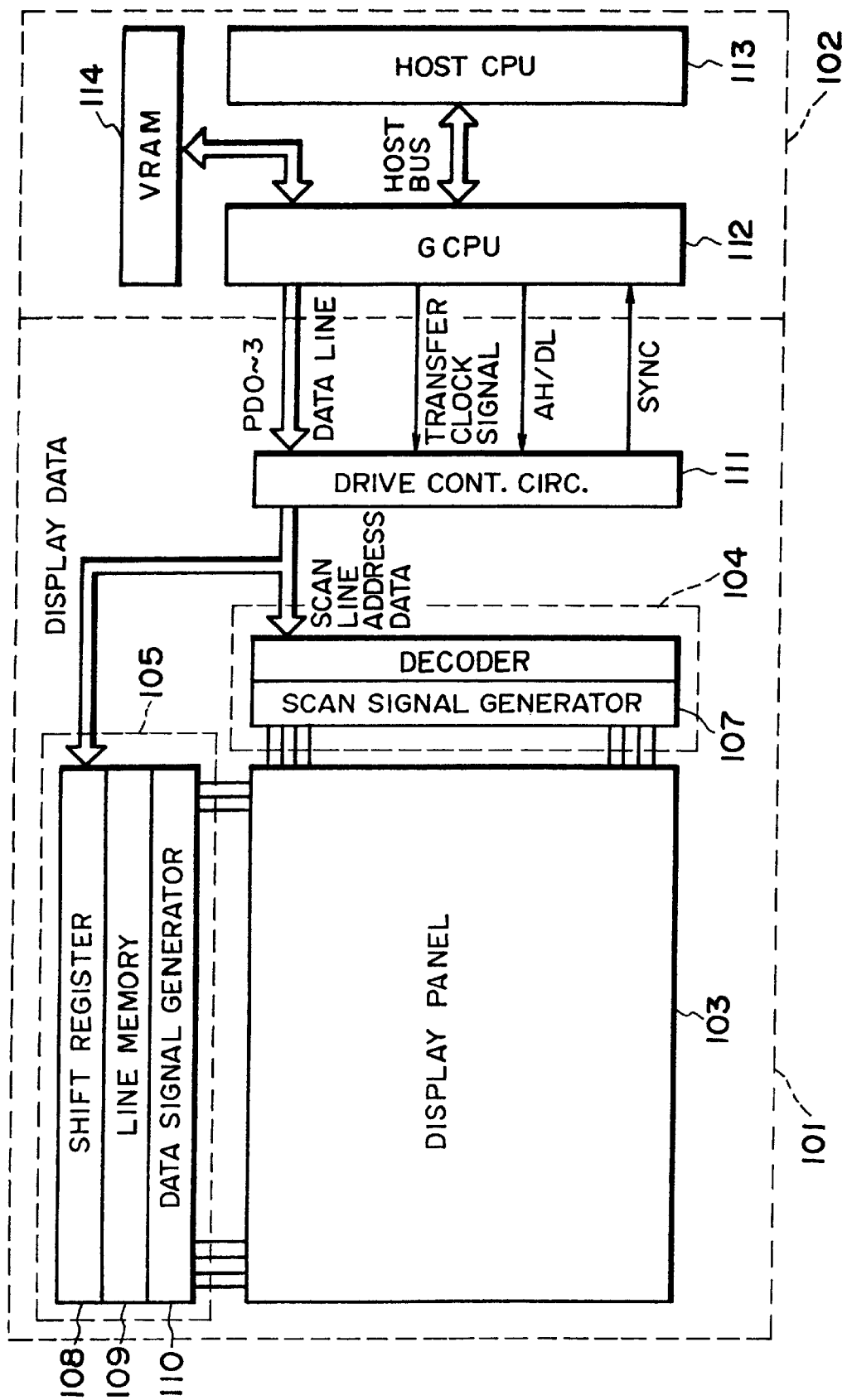
FIG. 4 is a block diagram showing a liquid crystal display apparatus comprising a liquid crystal device of the present invention and a graphic controller.

Based on an arrangement appearing hereinbelow and data format comprising image data accompanied with scanning line address data and by adopting communication synchronization using a SYNC signal as shown in FIGS. 4 and 5, there is provided a liquid crystal display apparatus of the present invention which uses the liquid crystal device according to the present invention as a display panel portion.

Referring to FIG. 4, a chiral smectic liquid crystal display apparatus 101 includes a graphic controller 102, a display panel 103, a scanning line drive circuit 104, a data line drive circuit 105, a decoder 106, a scanning signal generator 107, a shift resistor 108, a line memory 109, a data signal generator 110, a drive control circuit 111, a graphic central processing unit (GCPU) 112, a host central processing unit (host CPU) 113, and an image data storage memory (VRAM) 114.

Image data are generated in the graphic controller 102 in an apparatus body and transferred to a display panel 103 by signal transfer means. The graphic controller 102 principally comprises a GCPU 112 and a VRAM (video-RAM, image data storage memory) 114 and is in charge of management and communication of image data between a host CPU 113 and the liquid crystal display apparatus 101. The control of the display apparatus is principally performed by the graphic controller 102. A light source (not shown) is disposed behind the display panel 103.

The liquid crystal display apparatus of the present invention employs the above-described liquid crystal device, suppressed in alignment (orientation) irregularity thereby to provide a large (broad) drive margin described hereinafter, as a display panel (medium). As a result the display apparatus exhibits excellent drive characteristics and provides high-definition and large-area display images at high speed.

The liquid crystal device according to the present invention may be driven by simple matrix-driving methods as disclosed in, e.g., JP-A 59-193426, JP-A 59-193427, JP-A 60-156046 and JP-A 60-156047.

Figure 6:
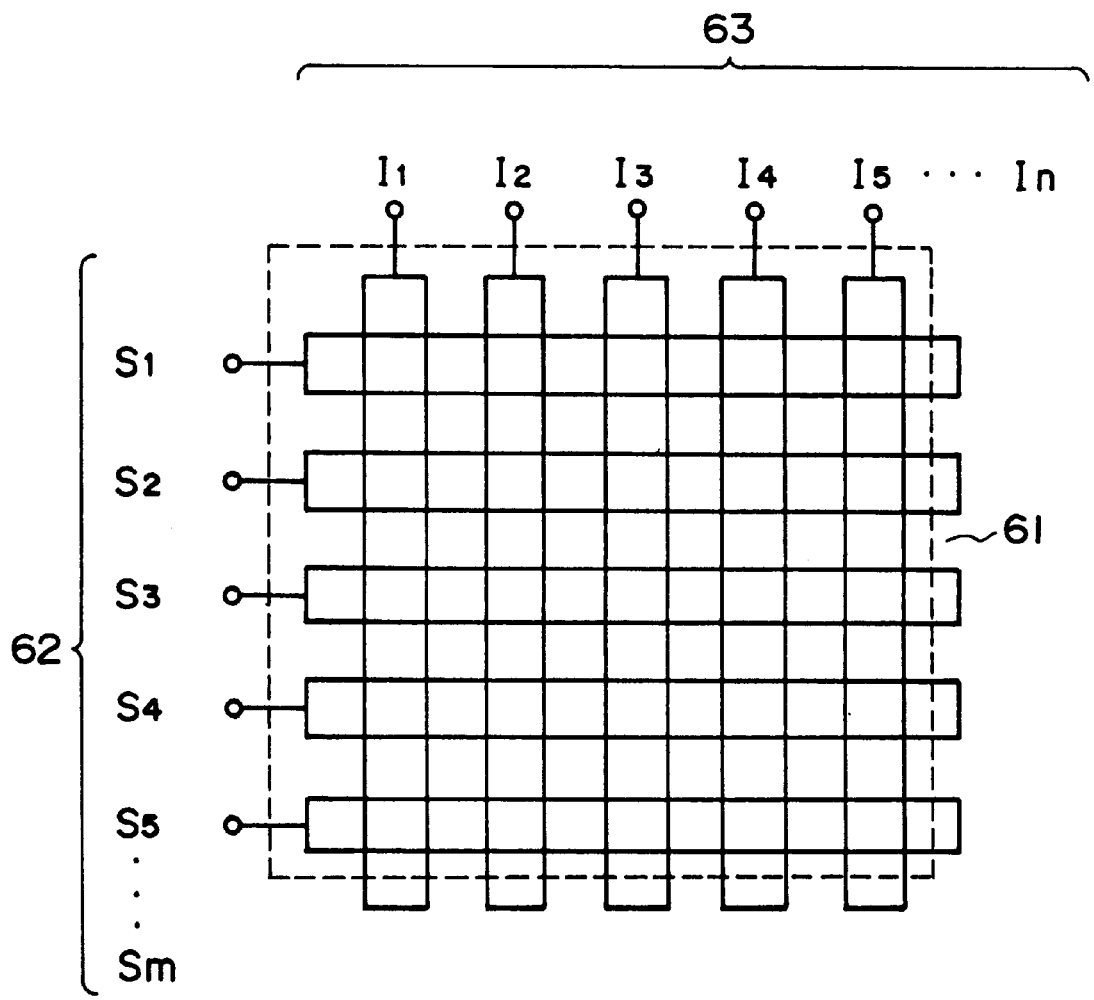
FIG. 6 is a plan view of a liquid crystal device provided with an electrode matrix.
Figure 7:
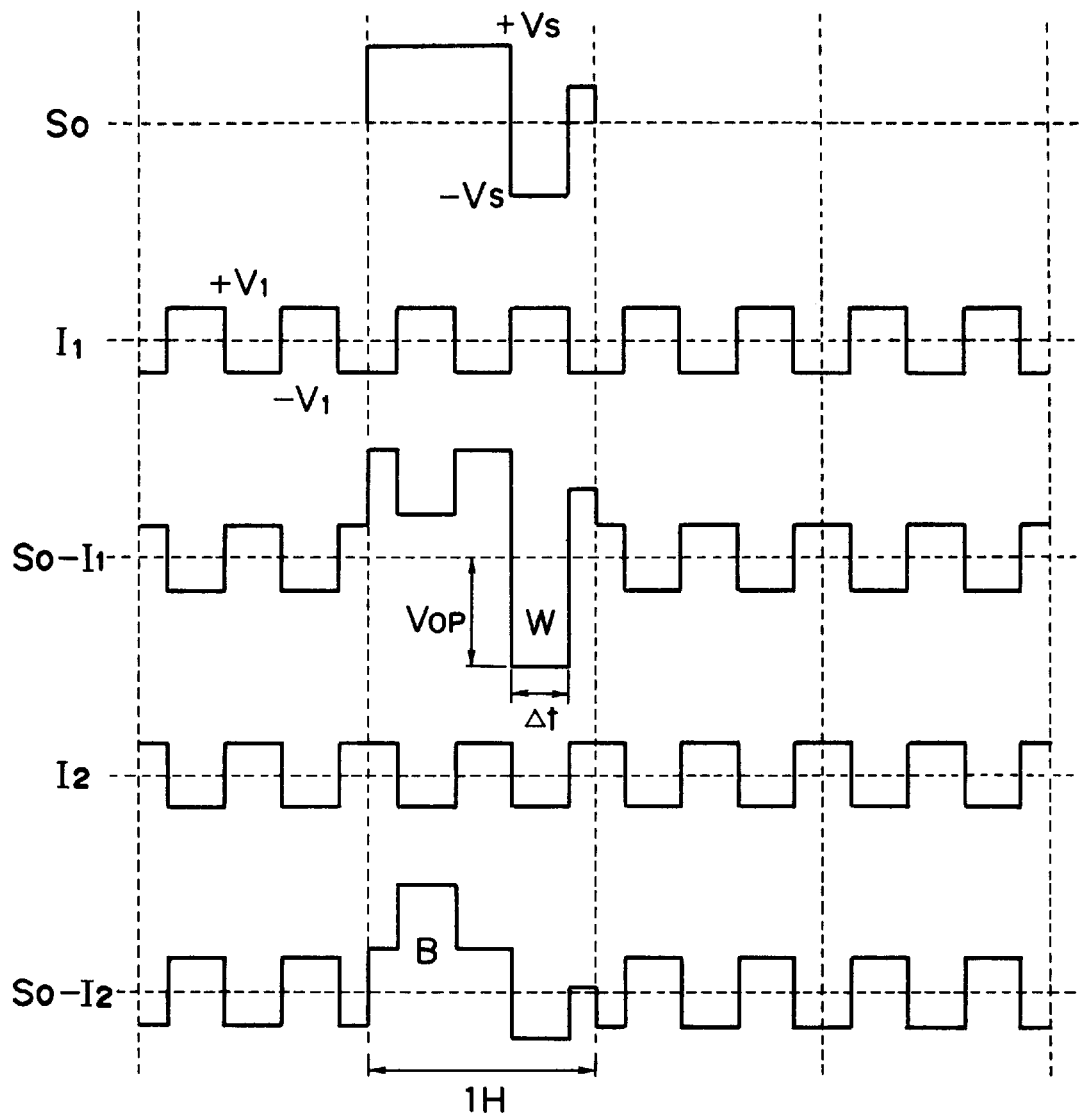
FIGS. 7 and 8 are respectively a set of drive waveforms used for driving a liquid crystal device according to the present invention.
Figure 8:
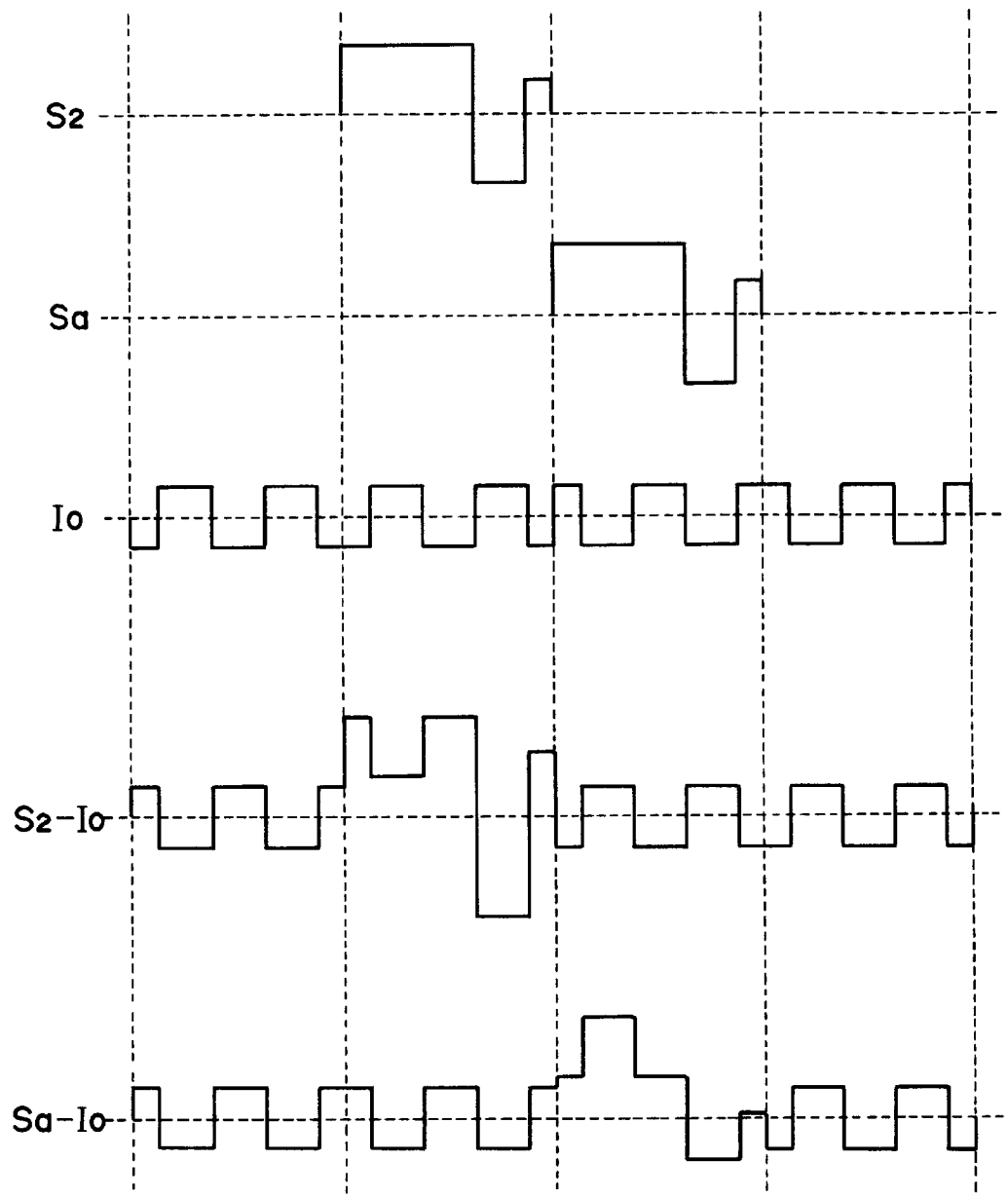

FIGS. 7 and 8 are an embodiment of a set of time-serial waveforms used in a (multiplexing) driving method for the electrode matrix structure shown in FIG. 6.

FIG. 7 shows reset writing-type waveforms wherein a black display state (B) is given by a positive (+) polarity based on a scanning line side and is also set as a reset state (reset direction).

Referring to FIG. 7, at $S_0$ is shown a scanning signal waveform applied to a scanning line, at $I_1$ is shown a data signal waveform (providing a white (W) display state) applied to a selected data line, and at $I_N$ is shown a data signal waveform (providing a black (B) display state) applied to a data line. Further, at ($S_0-I_1$) and ($S_0-I_2$) in the figure are shown voltage waveforms applied to pixels on a selected scanning line, whereby a pixel supplied with the voltage ($S_0-I_1$) assumes a white display state and a pixel supplied with the voltage ($S_0-I_2$) assumes a black display state. When four consecutive pixels on one data line are supplied with voltages to assume W, W, B and B display states, respectively, by using the waveforms shown in FIG. 7; the voltage (time-serial waveforms) ($S_2-I_0$) and ($S_3-I_0$) shown n FIG. 8 are applied to the second and third pixels, respectively.

In the driving embodiment shown in FIGS. 7 and 8 based on a writing pulse width or duration Δt of a single polarity voltage applied to a pixel on a selected scanning line, a one-line clearing pulse width is set to (5/2)Δt.

Further, after the writing pulse Δt, an auxiliary pulse of an opposite polarity (1/2)Δt (or the reset pulse side) is set. Accordingly, in the driving waveforms shown in FIGS. 7 and 8, one horizontal line scan period (1H) is set to 4Δt.

Other than the driving waveforms shown in FIG. 8 wherein a sequential scanning is performed without providing a period in which adjacent scanning signal waveforms to be outputted overlap each other ("waveform-overlapping period"), it is practically possible to decrease a 1H (e.g., 2Δt) by providing a waveform-overlapping period (e.g., 2Δt) with respect to at least two scanning lines (e.g., adjacent two scanning lines).

The parameters including scanning signal voltage $V_S$, data signal voltage $V_I$, driving voltage $Vop=V_S+V_I$, bias ratio $V_I/(V_S+V_I)$, and pulse period Δt in the driving waveforms shown in FIGS. 6A and 6B are determined depending on switching characteristics of a liquid crystal material used.

Figure 9:
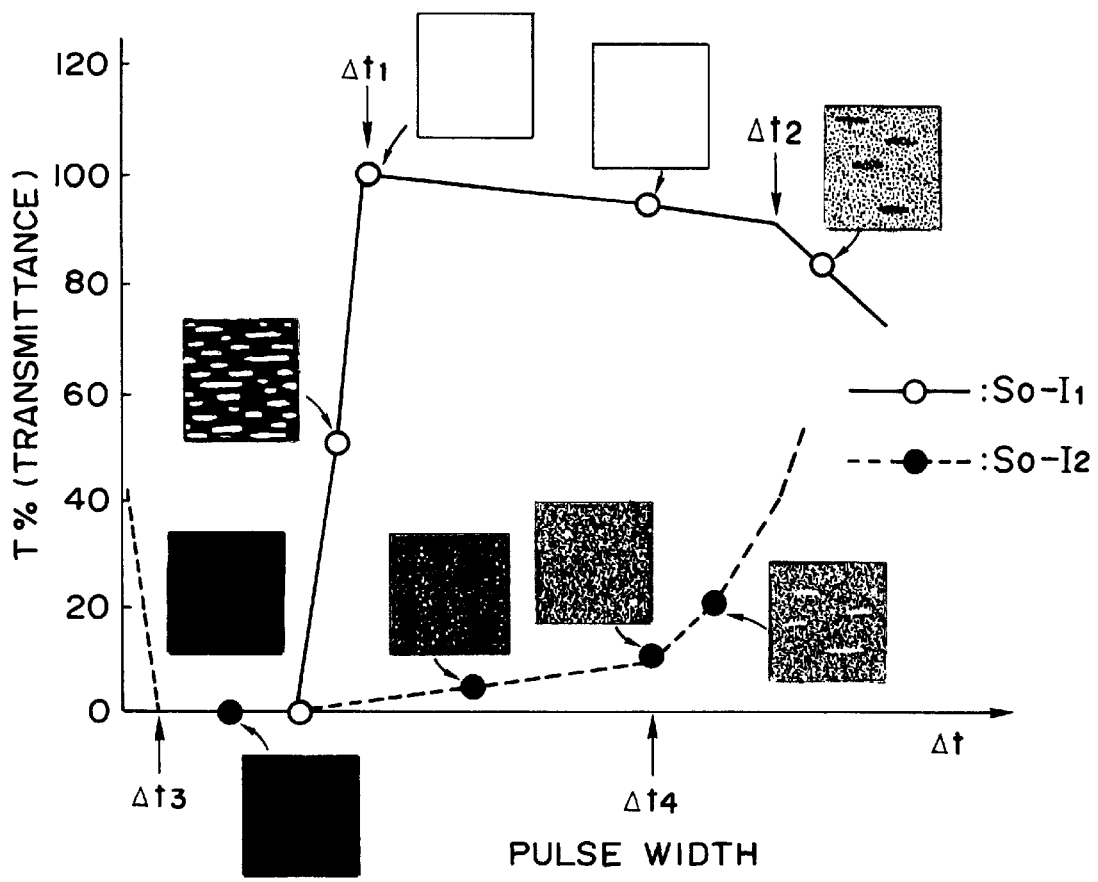
FIG. 9 is a graph showing a relationship between a pulse width (Δt) and a transmittance (T) when the drive waveforms shown in FIG. 7 are used.

FIG. 9 shows a change in transmittance T (%) on a selected pixel concerned when a pulse width Δt is changed after a driving waveform. In this embodiment, the parameters are fixed at constant values of a driving voltage Vop=20 volts and a bias ratio $V_I/(V_I+V_S)=1/3.4$. Referring to FIG. 9, a solid line (plotted with 0) when the voltage $(S_0-I_1)$ (reset into B and W writing) shown in FIG. 7 is applied to a pixel concerned, and a broken line (plotted by) represents a transmittance change when the voltage $(S_0-I_2)$ (reset into B and B holding) shown in FIG. 8 is applied to a pixel concerned, respectively.

In the case of applying the voltage waveform $(S_0-I_1)$ for displaying a W (white) state, a previous display state is a B (black) state and is completely written into a W state with a writing pulse width of at least $\Delta t_1$. Further, when the writing pulse width (Δt) exceeds $\Delta t_2$, the writing into W state is little performed since the auxiliary pulse of the opposite polarity subsequent to the W writing pulse of the waveform $(S_0-I_1)$ shown in FIG. 7 is applied for directing the pixel concerned toward B state.

In the case of applying the voltage waveform $(S_0-I_2)$ for displaying a B state, a previous display state is a W state and is completely reset into and held at a B state with a pulse width of at least $\Delta t_3$. Further, when the pulse width (Δt) exceeds $\Delta t_4$, the holding at B state is little performed since the auxiliary pulse of the opposite polarity subsequent to the B pulse of the waveform $(S_0-I_2)$ shown in FIG. 7 is applied for directing the pixel concerned toward W state.

Generally, the pulse width $\Delta 4t_1$ is larger than the pulse width $\Delta t_3$ ($\Delta t_1>\Delta t_3$), so that the pulse width Δt is referred to as a threshold pulse width. Further, the pulse width $\Delta t_2$ may be referred to as a white crosstalk pulse width and the pulse width $\Delta t_4$ may be referred to as a black crosstalk pulse width. In the embodiment shown in FIG. 9, the pulse width $\Delta t_4$ is smaller than the pulse width $\Delta t_2$ ($\Delta t_4<\Delta t_2$), so that the pulse width $\Delta t_4$ is referred to as a crosstalk pulse width.

When a pulse width Δt locating between $\Delta t_1$ (threshold pulse width) and $\Delta t_4$ (crosstalk pulse width) is employed for a driving waveform, it is possible to effect a matrix driving. As a result, the W displaying waveform $(S_0-I_1)$ shown in FIG. 7 ensures a W display state and the B displaying waveform $(S_0-I_2)$ shown in FIG. 7 ensures a B display state, so that it becomes possible to effect a good image display of W and B states by merely changing the polarity of the data signal waveform used.

It is of course possible to increase the values of the crosstalk pulse widths $\Delta t_2$ and $\Delta t_4$ by increasing the bias ratio (i.e., by causing the bias ratio to approach a unity). However, a large bias ratio corresponds to a large amplitude of a data signal and leads to an increase in flickering and a lower contrast, thus being undesirable in respect of image quality. According to our study, a bias ratio of about 1/3–1/5 was practical.

In the present invention, in order to effect a quantitative evaluation of a drive margin representing a degree of allowance for designing driving conditions, the above-mentioned threshold pulse width $\Delta t_1$ and the crosstalk pulse width $\Delta t_4$ (or $\Delta t_2$) are used to present a driving margin parameter M2 (M2 margin) which is a parameter of a pulse width ratio on the basis of an average (central) value of these values. The M2 margin is obtained by the following equation:

(M2 margin)=$(\Delta t_4-\Delta t_1)/(\Delta t_4+\Delta t_1)$.

The above-described drive margin by which selected pixels are written in two states of "black" and "white" depending on two opposite polarities of data signals and non-selected pixels can retain the written "black" and "white" states at a constant temperature as described above, vary depending on and are intrinsic to a liquid crystal material used and a cell structure employed. Further, the driving margin is changed according to a change in environmental temperature, so that optimum driving conditions should be required of an actual liquid crystal display apparatus in view of a liquid crystal material used, a cell (device) structure and an environmental temperature. The larger drive margin parameter M2 described above is advantageous to a practical display device or apparatus.

Incidentally, the driving characteristic shown in FIG. 9 may be evaluated by changing a driving voltage Vop (while fixing the pulse width Δt) or by changing both the Vop and Δt.

Next, an example of an ordinary active matrix driving method applicable to the liquid crystal device using the active matrix substrate (plate) as described above will be described with reference to FIGS. 13 and 14 in combination with FIG. 12.

Figure 13:
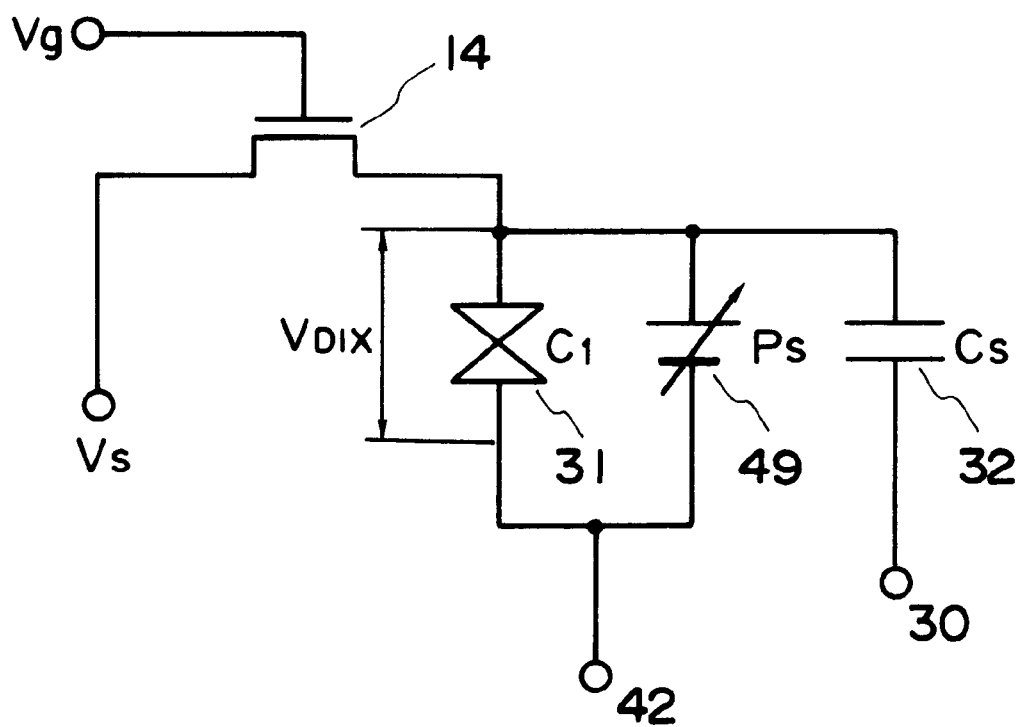
FIG. 13 is an embodiment of an equivalent circuit of each pixel portion shown in FIG. 12.

FIG. 13 shows an example of an equivalent circuit for each pixel portion of such a liquid crystal device shown in FIG. 12.

FIG. 14(a) shows a voltage waveform applied to one gate line (e.g., G1 shown in FIG. 12) (as a scanning line) connected with each pixel.

In the liquid crystal device driven by the active matrix driving method, the gate lines G1, G2, ... shown in FIG. 12 are selected in a line-sequential manner. At this time, each electrode 22 connected with a corresponding gate line is supplied with a prescribed gate voltage Vg in a selection period $T_{on}$, thus placing the TFT 14 in an "ON" state. In a non-selection period (frame period) $T_{off}$ corresponding to a period in which other gate lines are selected, the gate electrode 22 is not supplied with the gate voltage Vg, thus placing the TFT 14 in an "OFF" state (high-resistance state). In every non-selection period $T_{off}$, a prescribed and same gate line is selected and a corresponding gate electrode 22 is supplied with the gate voltage Vg.

FIG. 14(b) shows a voltage waveform applied to one source line (e.g., S1 shown in FIG. 12) (as a data signal line) connected to the pixel concerned.

When the gate electrode 22 is supplied with the gate voltage Vg in the selection period $T_{on}$, in synchronism with this voltage application, a prescribed source voltage (data signal voltage) Vs having a potential providing a writing data (pulse) to the pixel concerned is applied to a source electrode 27 through the source line connected with the pixel based on a potential Vc of a common electrode 42 as a reference potential.

At this time, the TFT 14 is in an "ON" state, whereby the source voltage Vs applied to the source electrode 27 is applied to a pixel electrode 15 via a drain electrode 28, thus charging a liquid crystal capacitor (Clc) 31 and a holding capacitor (Cs) 32.

As a result, the potential of the pixel electrode 15 becomes a level equal to that of the source (data signal) voltage VS.

On the other hand, in a non-selection period $T_{off}$ of the gate line on the pixel concerned, the TFT 14 is in an "OFF" (high-resistance) state. At this time, in the liquid crystal cell, ideally. The liquid crystal capacitor (Clc) 31 and the holding capacitor (Cs) 32 retain the electric charges therein, respectively, charged in the selection period $T_{on}$ to keep the source voltage Vs. As a result, the pixel concerned provides an optical or display state based on the source voltage level.

Figure 14:
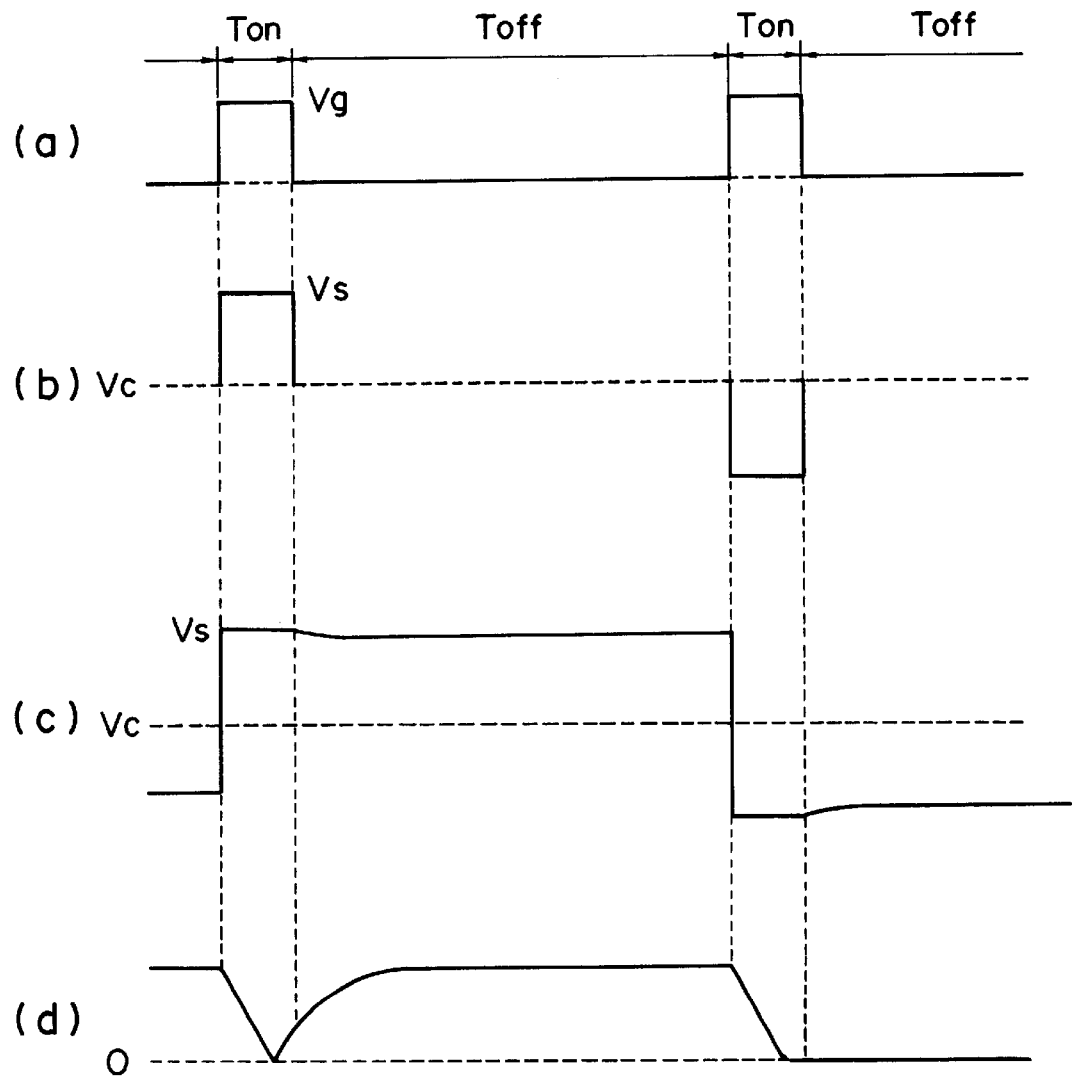
FIG. 14 shows a set of applied voltages (a), (b) and (c) with respect to each pixel portion shown in FIG. 12 and an optical response (d) at the pixel portion.

FIG. 14(*c*) shows a waveform of a pixel voltage Vpix actually held by the liquid crystal capacitor (Clc) 31 and the holding capacitor (Cs) 32 of the pixel concerned and also applied to the liquid crystal layer 49.

FIG. 14(*d*) shows an example of an actual optical response at the pixel concerned.

Hereinbelow, the present invention will be described more specifically based on Examples. It is however to be understood that the present invention is not restricted to these Examples.

EXAMPLE 1 AND COMPARATIVE EXAMPLE 1

Two glass substrates were respectively coated with a 700 Å-thick ITO film by sputtering of an ITO target in a DC sputtering apparatus at a discharge power of 1 W/cm² for 2.5 min. under flowing of sputtering gases of Ar at a rate of 90 SCCM and $O_2$ at a rate of 10 SCCM. Thereafter, the ITO films were patterned into rectangular electrodes (1 cm×1 cm), respectively, by an ordinary wet etching process.

Then, one of the substrates provided with the ITO electrodes was coated with a solution of ladder-form polysiloxane binder in ethanol further containing ca. 100 Å-dia. Sb-doped $SnO_x$ ultra-fine particles (solid matter content=5 wt. %, particle/binder weight ratio=50/50) by spin coating at 1000 rpm for 10 sec., followed by baking at 200° C. for 60 min. to provide a 1500 Å-thick alignment control layer A.

Then, the other substrate was coated with a 0.5 wt. %-solution of a precursor of a polyimide having the following recurring unit in a 2/1-mixture solvent of NMP (N-methylpyrrolidone)/nBC (n-butyl cellosolve) by spin coating at 500 rpm for 15 sec. and 1500 rpm for 30 sec., followed by baking at 200° C. for 60 min. to form a 50 Å-thick polyimide film.

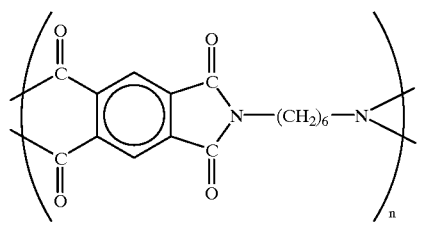

The polyimide film on the substrate was further subjected to a rubbing treatment comprising two times of rubbing in one direction at a revolution speed of 1000 rpm, a pressing depth of 0.4 mm and a feed speed of 50 mm/sec., to obtain an alignment control layer B.

A dispersion of 2.4 µm-dia. $SiO_2$ beads in isopropanol was applied by spin coating over the alignment control layer B and heated to distribute and fix the $SiO_2$ beads thereat.

On the other hand, an epoxy sealing agent was applied by printing along a periphery except for a part providing a liquid crystal injection port on the substrate provided with the alignment control layer A and prebaked at 90° C. for 5 min. Then, the thus treated two substrates were bonded to each other under a pressure of 50 g-f/cm² by a pressing machine. Further, under application of the same pressure by air cushion, the substrates were heated at 150° C. for 90 min. to form a blank cell wherein the sealing agent was cured. Then, the blank cell was placed in an ordinary load lock-type vacuum chamber, which was then evacuated to a vacuum of $1.0\times10^{-3}$ Pa. Then, the injection port of the cell was dipped within a liquid crystal in a reservoir heated at 85° C. under a vacuum of 1.0 Pa to inject a liquid crystal material into the cell to prepare a liquid crystal device (cell). Then, the cell was placed between a pair of polarizers.

Incidentally, the liquid crystal material used in this example was a liquid crystal composition (FLC-1) which was a mixture of the following compounds (a)–(e) in indicated weight ratios.

| Compound No. | Structural formula |
|---|---|
| (a) |  |
| (b) | 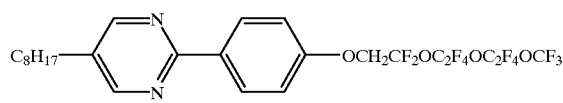 |
| (c) | 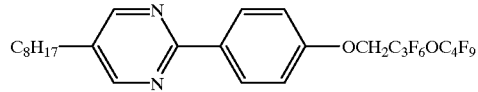 |
| (d) | 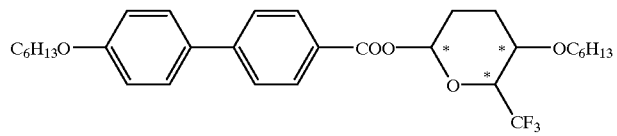 |

-continued

| Compound No. | Structural formula |
|---|---|
| (e) | 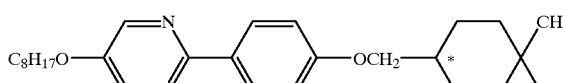 |

<FLC-1>

(components)   (wt. parts)
(a):(b):(c):(d):(e) = 45:30:15:5:2
Phase transition (° C.):

Iso. $\xrightarrow{77}$ SmA $\xrightarrow{41}$ SmC* $\xrightarrow{3}$ Cry.

Spontaneous polarization Ps (30° C.)=−31.1 nC/cm$^2$
Layer spacing $d_A$ ($T_{AC}$=41° C.)=31.756 Å
$T_{AC}$: phase transition temperature form SmA to SmC*
Layer spacing d (30° C.)=31.636 Å

The above spontaneous polarization of the liquid crystal composition FLC-1 was measured according to "Direct Method with Triangular Waves for Measuring Spontaneous Polarization in Ferroelectric Liquid Crystal", as described by K. Miyasato et al (Jap. J. Appl. Phys. 22, No. 10, L661 (1983)).

The layer spacings d and dA for the liquid crystal composition FLC-1 were measured at prescribed temperatures according to the above-described method.

The results are shown in Table 1 below.

TABLE 1

| Temperature (° C.) | d (Å) | d/d$_A$ |
|---|---|---|
| 75 | 30.562 | 0.962401 |
| 70 | 30.845 | 0.971313 |
| 65 | 31.085 | 0.978870 |
| 60 | 31.299 | 0.985609 |
| 55 | 31.506 | 0.992127 |
| 50 | 31.666 | 0.997166 |
| 45 | 31.756 | 1 |
| 41 | 31.756 | 1 |
| 40 | 31.726 | 0.999055 |
| 35 | 31.666 | 0.997166 |
| 30 | 31.636 | 0.996221 |
| 25 | 31.636 | 0.996221 |
| 20 | 31.686 | 0.997796 |
| 10 | 31.771 | 1.000472 |

$d_A$: layer spacing at the SmA → SmC* phase transition temperature (41° C.)

As apparent from Table 1, the liquid crystal composition FLC-1 showed an increase in layer spacing of about 4% temperature decrease (from 75° C. to 45 ° C. in SmA phase.

In Example 1, the liquid crystal device including the liquid crystal composition was subjected to the following sequential heat treatment.

| Temperatures (° C.) | Changing rate (° C./min) |
|---|---|
| 80 → 50 (cooling) | −1 |
| 50 → 70 (heating) | 1 |
| 70 → 30 (cooling) | −1 |

On the other hand, in Comparative Example 1, the following heat treatment was performed with respect to a liquid crystal device separately prepared in the same manner as described above.

| Temperatures (° C.) | Changing rate (° C./min) |
|---|---|
| 80 → 30 (cooling) | −1 |

Each of the thus treated liquid crystal devices (Example 1 and Comparative Example 1) was subjected to observation of a state of the phase transition from SmA phase to SmC* phase during the (final) cooling step to 30° C.

Generally, the SmA→SmC* phase transition is not necessarily caused over the entire cell area at the same time, thus resulting in an irregularity in phase transition temperature due to some irregularity or unevenness within the cell. For this reason, the SmA→SmC* phase transition provides a certain temperature range (several 0° C.) from its initiation to its completion. Such a temperature range is referred to as "AC co-present range".

In this regard, the liquid crystal device of Example 1 showed an AC co-present range of 1.0° C. and the (comparative) liquid crystal device of Comparative Example 1 showed an AC co-present range of 3.5° C. Accordingly, the liquid crystal device of the present invention was found to be improved in alignment (orientation) irregularity, thus improving a display quality.

Then, each of the liquid crystal device (of Example 1 and Comparative Example 1) was evaluated with respect to a driving characteristic as shown in FIG. 9 for determinating a drive margin parameter M2 (M2 margin) as defined above by using drive waveforms as shown in FIGS. 7 and 8 under conditions including: Vop=20 volts, bias ratio=1/3.4, duty ratio=1/1000, and white and black display on one pixel.

The liquid crystal device of Example 1 showed an M2 margin of 0.3.

On the other hand, the liquid crystal device of Comparative Example 1 showed an M2 margin of 0.2. This may be attributable to an alignment irregularity between P1 and P2 regions as mentioned above causing alignment defects at a boundary therebetween, thus leading to an occurrence of an anomalous reverse domain.

As described above, the liquid crystal device of the present invention was found to provide a broader drive margin by effectively suppressing an occurrence of the alignment irregularity.

EXAMPLES 2 AND 3 AND COMPARATIVE EXAMPLE 2

Liquid crystal devices (for Examples 2 and 3 and Comparative Example 2) were prepared in the same manner as in Example 1.

The liquid crystal device were subjected to the following sequential heat treatments, respectively.

Examples 2 and 3

| Temperatures (° C.) | Changing rate (° C./min) |
|---|---|
| 80 → 50 (cooling 1) | −1 |
| 50 → 70 (heating 1) | 1 |
| 70 → 50 (cooling 2) | −1 |
| 50 → 70 (heating 2) | 1 |
| 70 → 50 (cooling 3) | −1 |
| 50 → 70 (heating 3) | 1 |
| 70 → 50 (cooling 4) | −1 |
| 50 → 30 (cooling 5*) | −1 |
| 70 → 50 (cooling) | −1 |

In Example 3, the liquid crystal device was supplied with a voltage of +1 volt and 1H in a range from 40° C. to 30° C. (in SmC* phase) in the step of cooling 5.

Comparative Example 2

| Temperatures (° C.) | Changing rate (° C./min) |
|---|---|
| 80 → 30 (cooling 1) | −1 |

Figure 10:
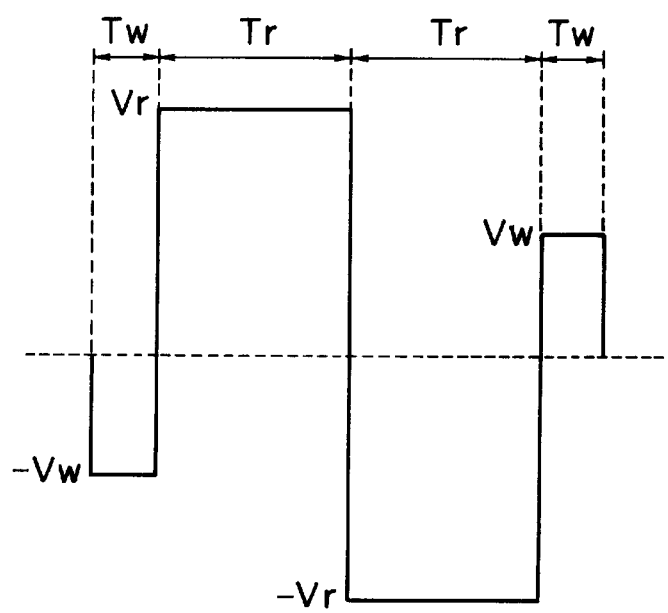
FIG. 10 is a drive waveform used for measurement of a V-T (applied voltage—transmittance) characteristic in Examples and Comparative Examples appearing hereinafter.

Each of the above-treated liquid crystal devices was subjected to measurement of a V-T characteristic by using a waveform as shown in FIG. 10 under conditions including: reset pulse width Tr=100 μsec, reset voltage Vr=20 volts, writing pulse width=20 μsec, varying writing voltage Vw (from 0 volt to a voltage providing a white state). For measurement, values of transmitted light intensity (T) after a lapse of 800 msec from the pulse application were measured.

In this regard, when the light intensity (T) providing a white state is standardized as "100%" and that providing a black state is standardized as "0%", a voltage ratio (V95/V5) (wherein V5 represents a voltage providing T=95% and V95 represents a voltage providing T=5%) is defined as "γ".

As a result, the liquid crystal devices provided the following values of γ, respectively.

| Device for | γ (V95/V5) |
|---|---|
| Example 5 | 1.1 |
| Example 3 | 1.08 |
| Comp. Example 2 | 1.2 |

From the above results, the liquid crystal devices of Examples 2 and 3 (according to the present invention) were found to provided less threshold inversion irregularity.

Further, it was found that the liquid crystal of Example 3 subjected to the voltage application in SmC* phase was effective in suppressing an irregularity in device characteristic.

EXAMPLES 4 AND COMPARATIVE EXAMPLE 3

Liquid crystal devices (for Example 4 and Comparative Example 3) were prepared and subjected to heat treatments in the same manner as in Example 1 and Comparative Example 1, respectively, except that the ITO films were patterned in a stripe shape (width=100 μm and spacing=10 μm) and were arranged in a simple matrix structure to form an electrode matrix.

Then, each of the thus prepared simple matrix-type liquid crystal device (of Example 4 and Comparative Example 3) was evaluated with respect to a driving characteristic as shown in FIG. 9 for determining a drive margin parameter M2 (M2 margin) as defined above by effecting a matrix driving using cross nicol polarizers (sandwiching the device) and drive waveforms as shown in FIGS. 7 and 8 under conditions including: Vop=20 volts, bias ratio=1/3.4, duty ratio=1/1000, and white and black display on one pixel.

The liquid crystal device of Example 4 showed an M2 margin of 0.25.

On the other hand, the liquid crystal device of Comparative Example 3 showed an M2 margin of 0.16. This may be attributable to an alignment irregularity between P1 and P2 regions as mentioned above causing alignment defects at a boundary therebetween, thus leading to an occurrence of an anomalous reverse domain.

As described above, the simple matrix-type liquid crystal device of the present invention was found to provide a broader drive margin by effectively suppressing an occurrence of the alignment irregularity.

EXAMPLE 5 AND COMPARATIVE EXAMPLE 4

Color liquid crystal devices (for Example 5 and Comparative Example 4) were prepared and heat-treated in the same manner as in Example 1 and Comparative Example 1, respectively, except that an a-Si TFT including a gate insulating film of silicon nitride is provided to a substrate having an alignment control layer A, and that a color filter comprising segments of R (red), G (green) and B (blue) is provided to a substrate having an alignment control layer B.

Each of the thus prepared color liquid crystal devices of an active matrix-type included a plurality of pixels (600× 800×3 (R, G, B) pixels) each having a structure as shown in FIG. 12 and had a display area of 10.4 in.

The color liquid crystal devices were respectively subjected to measurement of a driving source) voltage Vs required to effect switching from a black state to a white state with respect to portion A (left-side end portion), portion B (center portion), and portion C (right-side end portion) each having a size of 2 cm×2 cm and on a center line in a lengthwise direction of the display region under conditions including: selection period ($T_{on}$)=28 μsec, non-selection period ($T_{off}$)=16.77 msec, and panel-face temperature=30° C.

The results are shown in Table 2 below.

TABLE 2

| Example No. | Driving voltage Vs (volts) | | |
|---|---|---|---|
| | Portion A | Portion B | Portion C |
| Ex. 5 | 8.5 | 8.6 | 8.6 |
| Comp. Ex. 4 | 8.7 | 9.0 | 9.2 |

As apparent from the above results, the active matrix-type color liquid crystal device according to the present invention provided less irregularity (change) in driving voltage (Vs) over the entire display region, thus resulting in a good color display panel in respect of uniformity in display image.

As described hereinabove, according to the present invention, it is possible to minimize an irregularity in device according to minimize an irregularity in device characteristics (alignment characteristic, driving characteristics, etc.) resulting from a layer compression irregularity in SmA phase on temperature decrease by employing the above-described specific heat treatment (particularly, at least one cycle of heating and cooling in SmA phase). The resultant liquid crystal device can provide a larger drive margin and thus is suitable for constituting a good display apparatus of high resolution, high speed and large display area.

What is claimed is:

1. An aligning method of a smectic liquid crystal, comprising:

disposing a smectic liquid crystal between a pair of electrode plates, said smectic liquid crystal having a layer spacing-changing characteristic providing a layer spacing which increases on temperature decrease in a first temperature range in smectic A phase; and subjecting said smectic liquid crystal to a heat treatment comprising: (i) a sequence of cooling said smectic liquid crystal from a higher temperature than its smectic A phase temperature to a second temperature range in smectic A phase, wherein said second temperature range includes at least a portion of the first temperature range, (ii) at least one cycle of heating and cooling within the second temperature range, and (iii) further cooling to a smectic phase lower than smectic A phase.

2. A method according to claim 1, wherein said smectic liquid crystal is supplied with a voltage during the further cooling step (iii) to said smectic phase.

3. A method according to claim 1, wherein said heating or cooling is performed within a temperature range in smectic A phase wherein said layer spacing increases on temperature decrease by 1–10%.

4. A method according to claim 1, wherein said smectic liquid crystal has a bookshelf structure or a structure close thereto having a small layer inclination angle.

5. A method according to claim 1, wherein said smectic liquid crystal has no cholesteric phase.

6. A method according to claim 5, wherein said smectic liquid crystal is a chiral smectic liquid crystal composition comprising at least one species of a fluorine-containing mesomorphic compound having a fluorocarbon terminal portion and a hydrocarbon terminal portion, the terminal portions being connected with a central core, and having a smectic phase or a latent smectic phase.

7. A method according to claim 6, wherein said fluorocarbon terminal portion of the fluorine-containing mesomorphic compound is a group represented by the formula —$D^1$—$F_{xa}G_{2xa}$—X, where xa is 1–20; X is —H or —F; —$D^1$ is —CO—O—$(CH_2)_{ra}$—, —O—$(CH_2)_{ra}$—, —$(CH_2)_{ra}$—, —O—$SO_2$—, —$SO_2$—, —$SO_2$—$(CH_2)_{ra}$—, —O—$(CH_2)_{ra}$—O—$(CH_2)_{rb}$—, —$(CH_2)_{ra}$—N($C_{pa}$H$_{2pa+1}$)—$SO_2$— or —$(CH_2)_{ra}$—N($C_{pa}$H$_{2pa+1}$)—CO—; where ra and rb are independently 1–20; and pa is 0–4.

8. A method according to claim 6, wherein said fluorocarbon terminal portion of the fluorine-containing mesomorphic compound is a group represented by the formula —$D^2$—$(C_{xb}F_{2xb}$—O$)_{za}$—$C_{ya}F_{2ya+1}$, where xb is 1–10 independently for each ($C_{xb}F_{2xb}$—O); ya is 1–10; za is 1–10; —$D^2$— is —CO—O—$C_{rc}H_{2rc}$, —O—$C_{rc}H_{2rc}$—, —$C_{rc}H_{2rc}$—, —O—$(C_{sa}H_{2sa}$—O$)_{ta}$—$C_{rd}H_{2rd}$—, —O—$SO_2$—, —$SO_2$—, —$SO_2$—$C_{rc}H_{2rc}$—, —$C_{rc}H_{2rc}$—N($C_{pb}H_{2pb+1}$)—$SO_2$—, —$C_{rc}H_{2rc}$—N($C_{pb}H_{2pb+1}$)—CO—, or a covalent bond, where rc and rd are independently 1–20; sa is independently 1–10 for each ($C_{sa}H_{2sa}$—O); ta is 1–6; and pb is 0–4.

9. A method according to claim 6, wherein said fluorine-containing mesomorphic compound is represented by the following general formula (I):

Formula (I):

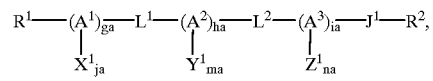

where $A^1$, $A^2$ and $A^3$ are each independently

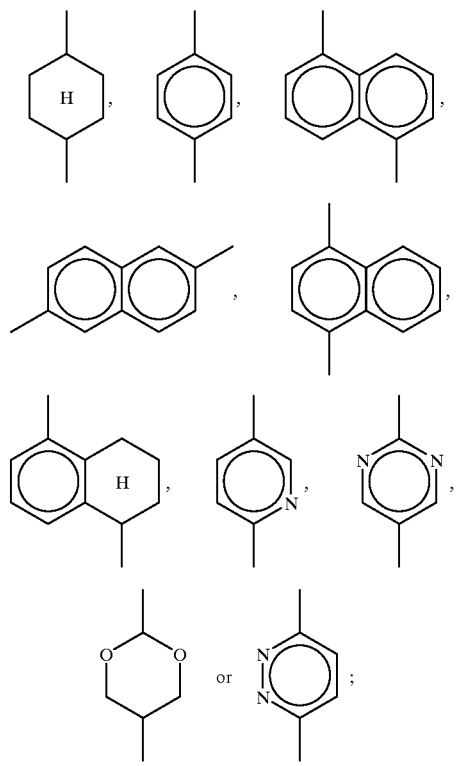

ga, ha and ia are independently an integer of 0–3 with the proviso that the sum of ga+ha+ia be at least 2;

$L^1$ and $L^2$ are each independently a covalent bond, —CO—O—, —O—CO—, —COS—, —S—CO—, —CO—Se—, —Se—CO—, —CO—Te—, —Te—CO—, —$CH_2CH_2$—, —CH=CH—, —C≡C—, —CH=N—, —N=CH—, —$CH_2$—O—, —O—$CH_2$—, —CO— or —O—;

$X^1$, $Y^1$ and $Z^1$ are each a substituent of $A^1$, $A^2$ and $A^3$, respectively, and each of $X^1$, $Y^1$ and $Z^1$ are independently —H, —Cl, —F, —Br, —I, —OH, —$OCH_3$, —$CH_3$, —CN or —$NO_2$;

each ja, ma and na are independently an integer of 0–4;

$J^1$ is —CO—O—$(CH_2)_{ra}$—, —O—$(CH_2)_{ra}$—, —$(CH_2)_{ra}$—, —O—$SO_2$—, —$SO_2$—, —$SO_2$—$(CH_2)_{ra}$—, —O—$(CH_2)_{ra}$—O—$(CH_2)_{rb}$—, —$(CH_2)_{ra}$—N($C_{pa}H_{2pa+1}$)—$SO_2$— or —$(CH_2)_{ra}$—N($C_{pa}H_{2pa+1}$)—CO—; where ra and rb are independently 1–20, and pa is 0–4;

$R^1$ is —O—$C_{qa}H_{2qa}$—O—$C_{qb}H_{2qb+1}$, —$C_{qa}H_{2qa}$—O—$C_{qb}H_{2qb+1}$, —$C_{qa}H_{2qa}$—$R^3$, —O—$C_{qa}H_{2qa}$—$R^3$, —CO—O—$C_{qa}H_{2qa}$—$R^3$, or —O—CO—$C_{qa}H_{2qa}$—$R^3$ which may be either straight chain or branched;

where $R^3$ is —O—CO—$C_{qb}H_{2qb+1}$, —CO—O—

$C_{qb}H_{2qb+1}$, —H, —Cl, —F, —CF$_3$, —NO$_2$ or —CN; and qa and qb are independently 1–20;

$R^2$ is $C_{xa}F_{2xa}$—X, where X is —H or —F, xa is an integer of 1–20.

10. A method according to claim 6, wherein said fluorine-containing mesomorphic compound is represented by the following general formula (II):

Formula (II):

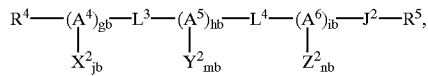

wherein $A^4$, $A^5$ and $A^6$ are each independently

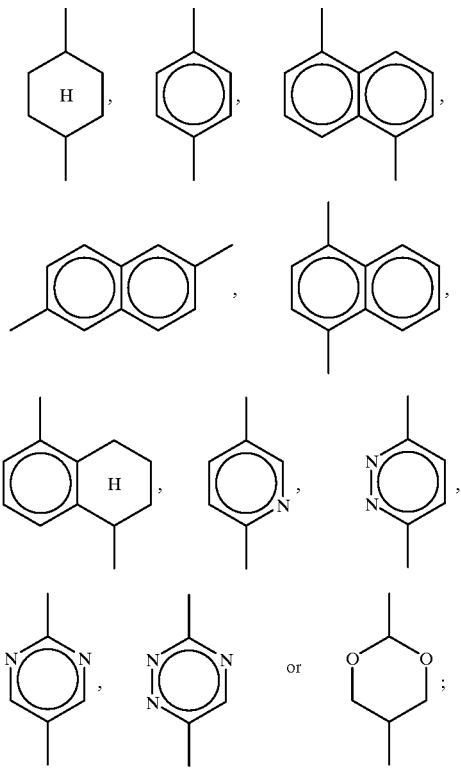

gb, hb and ib are each independently an integer of 0–3 with the proviso that the sum of gb+hb+ib be at least 2;

each $L^3$ and $L^4$ are independently a covalent bond, —CO—O—, —O—CO—, —CO—S—, —S—CO—, —CO—Se—, —Se—CO—, —CO—Te—, —Te—CO—, —(CH$_2$CH$_2$)$_{ka}$— (ka is 1–4), —CH═CH—, —C≡C—, —CH═N—, —N═CH—, —CH$_2$—O—, —O—CH$_2$—, —CO— or —O—;

$X^2$, $Y^2$ and $Z^2$ are each a substituent of $A^4$, $A^5$ and $A^6$, respectively, and each $X_2$, $Y_2$ and $Z_2$ are independently —H, —Cl, —F, —Br, —I, —OH, —OCH$_3$, —CH$_3$, —CF$_3$, —O—CF$_3$, —CN or —NO$_2$; each jb, mb and nb are independently an integer of 0–4;

$J^2$ is —CO—O—$C_{rc}H_{2rc}$—, —O—$C_{rc}H_{2rc}$—, —$C_{rc}H_{2rc}$—, —O—($C_{sa}H_{2sa}$—O)$_{ta}$—$C_{rd}H_{2rd}$—, —O—SO$_2$—, —SO$_2$—, —SO$_2$—$C_{rc}H_{2rc}$—, —$C_{rc}H_{2rc}$—N($C_{pb}H_{2pb+1}$)—SO$_2$— or —$C_{rc}H_{2rc}$—N($C_{pb}H_{2pb+1}$)—CO—; rc and rd are independently 1–20; sa is independently 1–10 for each ($C_{sa}H_{2sa}$—O), ta is 1–6; and pb is 0–4;

$R^4$ is —O—(C H$_{2qc}$—O)$_{wa}$—$C_{qd}H_{2qd+1}$, —($C_{qc}H_{2qc}$—O)$_{wa}$—$C_{qd}H_{2qd+1}$, —$C_{qc}H_{2qc}$—$R^6$, —O—$C_{qc}H_{2qc}$—$R^6$, —CO—O—$C_{qc}H_{2qc}$—$R^6$, or O—CO—$C_{qc}H_{2qc}$—$R^6$ which may be either straight chain or branched; $R^6$ is —O—CO—$C_{qd}H_{2qd+1}$; —CO—O—$C_{qd}H_{2qd+1}$, —Cl, —F, —CF$_3$, —NO$_2$, —CN or —H; qc and qd are independently an integer of 1–20; wa is an integer of 1–10;

$R^5$ is $(C_{xb}F_{2xb}—O)_{za}—C_{ya}F_{2ya+1}$, wherein xb is independently 1–10 for each $(C_{xb}F_{2xb}—O)$; ya is 1–10; and za is 1–10.

11. A method according to claim 1, wherein said smectic liquid crystal is a ferroelectric liquid crystal.

12. A method according to claim 1, wherein said smectic liquid crystal is an antiferroelectric liquid crystal.

13. A method according to claim 1, wherein said pair of electrodes plates are disposed to provide a plurality of pixels and include one electrode plate constituting an active matrix substrate provided with a plurality of switching elements provided to the pixels, respectively.

14. A process for producing a liquid crystal device, comprising:

injecting a smectic liquid crystal in isotropic phase into a gap between two contacting surfaces of a pair of oppositely disposed electrode plates, said smectic liquid crystal having a layer spacing-changing characteristic providing a layer spacing which increases on temperature decrease in a first temperature range in smectic A phase; and subjecting said smectic liquid crystal to a heat treatment comprising: (i) a sequence of cooling from isotropic phase to a second temperature range in smectic A phase including at least a portion of the first temperature range, (ii) at least one cycle of heating and cooling within the second temperature range, and (iii) further cooling to a smectic phase lower than smectic A phase.

15. A process according to claim 14, wherein at least one of said two contacting surfaces is provided by an alignment control layer.

16. A process according to claim 15, wherein both of said two contacting surfaces are provided by two alignment control layers, respectively.

17. A process according to claim 16, wherein said two alignment control layers are different from each other.

18. A process according to claim 16, wherein said two alignment control layers are identical to each other.

19. A process according to claim 14, wherein said smectic liquid crystal is supplied with a voltage during the further cooling step (iii) to said smectic phase.

20. A process according to claim 14, wherein said heating or cooling is performed within a temperature range in smectic A phase wherein said layer spacing increases on temperature decrease by 1–10%.

21. A process according to claim 14, wherein said smectic liquid crystal has a bookshelf structure or a structure close thereto having a small layer inclination angle.

22. A process according to claim 14, wherein said smectic liquid crystal has no cholesteric phase.

23. A process according to claim 22, wherein said smectic liquid crystal is a chiral smectic liquid crystal composition comprising at least one species of a fluorine-containing mesomorphic compound having a fluorocarbon terminal portion and a hydrocarbon terminal portion, the terminal portions being connected with a central core, and having a smectic phase or a latent smectic phase.

24. A process according to claim 23, wherein said fluorocarbon terminal portion of the fluorine-containing mesomorphic compound is a group represented by the formula $-D^1-F_{xa}G_{2xa}-X$, where xa is 1–20; X is —H or —F; $-D^1-$ is $-CO-O-(CH_2)_{ra}-$, $-O-(CH_2)_{ra}-$, $-(CH_2)_{ra}-$, $-O-SO_2-$, $-SO_2-$, $-SO_2-(CH_2)_{ra}-$, $-O-(CH_2)_{ra}-O-(CH_2)_{rb}-$, $-(CH_2)_{ra}-N(C_{pa}H_{2pa+1})-SO_2-$ or $-(CH_2)_{ra}-N(C_{pa}H_{2pa+1})-CO-$; where ra and rb are independently 1–20; and pa is 0–4.

25. A process according to claim 23, wherein said fluorocarbon terminal portion of the fluorine-containing mesomorphic compound is a group represented by the formula $-D^2-(C_{xb}F_{2xb}-O)_{za}-C_{ya}F_{2ya+1}$, where xb is 1–10 independently for each $(C_{xb}F_{2xb}-O)$; ya is 1–10; za is 1–10; $-D^2-$ is $-CO-O-C_{rc}H_{2rc}-$, $-O-C_{rc}H_{2rc}-$, $-C_{rc}H_{2rc}-$, $-O-(C_{sa}H_{2sa}-O)_{ta}-C_{rd}H_{2rd}-$, $-O-SO_2-$, $-SO_2-$, $-SO_2-C_{rc}H_{2rc}-$, $-C_{rc}H_{2rc}-N(C_{pb}H_{2pb+1})-SO_2-$, $-C_{rc}H_{2rc}-N(C_{pb}H_{2pb+1})-CO-$, or a covalent bond, where rc and rd are independently 1–20; sa is independently 1–10 for each $(C_{sa}H_{2sa}-O)$; ta is 1–6; and pb is 0–4.

26. A process according to claim 23, wherein said fluorine-containing mesomorphic compound is represented by the following general formula (I):

Formula (I):

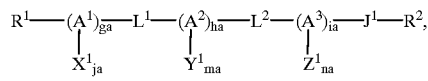

where $A^1$, $A^2$ and $A^3$ are each independently

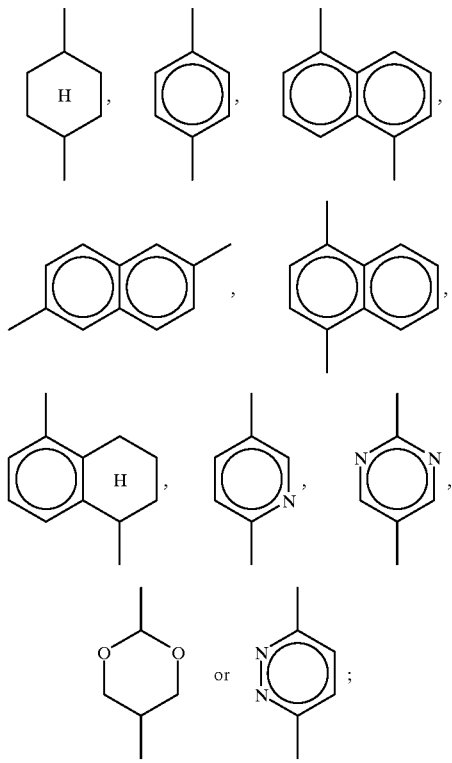

ga, ha and ia are independently an integer of 0–3 with the proviso that the sum of ga+ha+ia be at least 2;

$L^1$ and $L^2$ are each independently a covalent bond, —CO—O—, —O—CO—, —COS—, —S—CO—, —CO—Se—, —Se—CO—, —CO—Te—, —Te—CO—, —CH$_2$CH$_2$—, —CH=CH—, —C≡C—, —CH=N—, —N=CH—, —CH$_2$—O—, —O—CH$_2$—, —CO— or —O—;

$X^1$, $Y^1$ and $Z^1$ are each a substituent of $A^1$, $A^2$ and $A^3$, respectively, and each of $X^1$, $Y^1$ and $Z^1$ are independently —H, —Cl, —F, —Br, —I, —OH, —OCH$_3$, —CH$_3$, —CN or —NO$_2$;

each ja, ma and na are independently an integer of 0–4;

$J^1$ is —CO—O—(CH$_2$)$_{ra}$—, —O—(CH$_2$)$_{ra}$—, —(CH$_2$)$_{ra}$—, —O—SO$_2$—, —SO$_2$—, —SO$_2$—(CH$_2$)$_{ra}$—, —(CH$_2$)$_{ra}$—O—(CH$_2$)$_{rb}$—, —(CH$_2$)$_{ra}$—N(C$_{pa}$H$_{2pa+1}$)—SO$_2$— or —(CH$_2$)$_{ra}$—N(C$_{pa}$H$_{2pa+1}$)—CO—; where ra and rb are independently 1–20, and pa is 0–4;

$R^1$ is —O—C$_{qa}$H$_{2qa}$—O—C$_{qb}$H$_{2qb+1}$, —C$_{qa}$H$_{2qa}$—O—C$_{qb}$H$_{2qb+1}$, —C$_{qa}$H$_{2qa}$—R$^3$, —O—C$_{qa}$H$_{2qa}$—R$^3$, —CO—O—C$_{qa}$H$_{2qa}$—R$^3$, or —O—CO—C$_{qa}$H$_{2qa}$—R$^3$ which may be either straight chain or branched; where $R^3$ is —O—CO—C$_{qb}$H$_{2qb+1}$, —CO—O—C$_{qb}$H$_{2qb+1}$, —H, —Cl, —F, —CF$_3$, —NO$_2$ or —CN; and qa and qb are independently 1–20;

$R^2$ is $C_{xa}F_{2xa}$—X, where X is —H or —F, xa is an integer of 1–20.

27. A process according to claim 23, wherein said fluorine-containing mesomorphic compound is represented by the following general formula (II):

Formula (II):

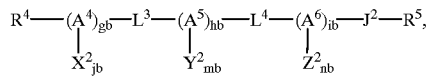

wherein $A^4$, $A^5$ and $A^6$ are each independently

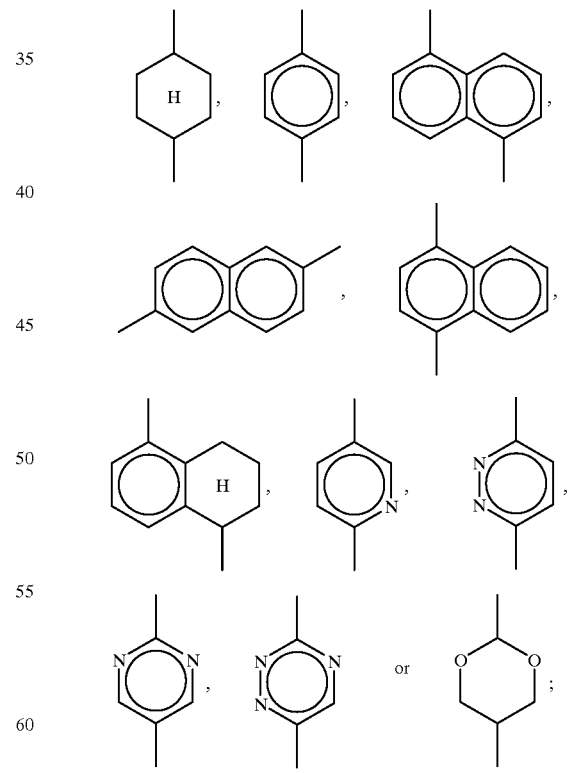

gb, hb and ib are each independently an integer of 0–3 with the proviso that the sum of gb+hb+ib be at least 2;

each $L^3$ and $L^4$ are independently a covalent bond, —CO—O—, —O—CO—, —CO—S—, —S—CO—, —CO—Se—, —Se—CO—, —CO—Te—, —Te—CO—, —(CH$_2$CH$_2$)$_{ka}$— (ka is 1–4), —CH═CH—, —C≡C—, —CH═N—, —N═CH—, —CH$_2$—O—, —O—CH$_2$—, —CO— or —O—;

X$^2$, Y$^2$ and Z$^2$ are each a substituent of A$^4$, A$^5$ and A$^6$, respectively, and each X$_2$, Y$_2$ and Z$_2$ are independently —H, —Cl, —F, —Br, —I, —OH, —OCH$_3$, —CH$_3$, —CF$_3$, —O—CF$_3$, —CN or —NO$_2$; each jb, mb and nb are independently an integer of 0–4;

J$^2$ is —CO—O—C$_{rc}$H$_{2rc}$—, —O—C$_{rc}$H$_{2rc}$—, C$_{rc}$H$_{2rc}$—, —O—(C$_{sa}$H$_{2sa}$—O)$_{ta}$—C$_{rd}$H$_{2rd}$—, —O—SO$_2$—, —SO$_2$—, —SO$_2$—C$_{rc}$H$_{2rc}$—, —C$_{rc}$H$_{2rc}$—N(C$_{pb}$H$_{2pb+1}$)—SO$_2$— or —C$_{rc}$H$_{2rc}$— N(C$_{pb}$H$_{2pb+1}$)—CO—; rc and rd are independently 1–20; sa is independently 1–10 for each (C$_{sa}$H$_{2sa}$—O), ta is 1–6; and pb is 0–4;

R$^4$ is —O—(C$_{qc}$H$_{2qc}$—O)$_{wa}$—C$_{qd}$H$_{2qd+1}$, —(C$_{qc}$H$_{2qc}$—O)$_{wa}$—C$_{qd}$H$_{2qd+1}$, —C$_{qc}$H$_{2qc}$—R$^6$, —O—C$_{qc}$H$_{2qc}$—R$^6$, —CO—O—C$_{qc}$H$_{2qc}$—R$^6$, or O—CO—C$_{qc}$H$_{2qc}$—R$^6$ which may be either straight chain or branched; R$^6$ is —O—CO—C$_{qd}$H$_{2qd+1}$; —CO—O—C$_{qd}$H$_{2qd+1}$, —Cl, —F, —CF$_3$, —NO$_2$, —CN or —H; qc and qd are independently an integer of 1–20; wa is an integer of 1–10;

R$^5$ is (C$_{xb}$F$_{2xb}$—O)$_{za}$—C$_{ya}$F$_{2ya+1}$, wherein xb is independently 1–10 for each (C$_{xb}$F$_{2xb}$—O); ya is 1–10; and za is 1–10.

28. A process according to claim 14, wherein said smectic liquid crystal is a ferroelectric liquid crystal.

29. A process according to claim 14, wherein said smectic liquid crystal is an antiferroelectric liquid crystal.

30. A process according to claim 14, wherein said liquid crystal device has a plurality of pixels and includes one electrode plate constituting an active atrix substrate provided with a plurality of switching elements provided to the pixels, respectively.

31. A liquid crystal device produced by a process according to any one of claims 14–30.

32. A liquid crystal apparatus, including: a liquid crystal device according to claim 31 and a drive means for driving the liquid crystal device.

* * * * *

UNITED STATES PATENT AND TRADEMARK OFFICE
CERTIFICATE OF CORRECTION

PATENT NO. : 6,083,574
DATED : July 4, 2000
INVENTOR(S) : YASUFUMI ASAO ET AL.

It is certified that error appears in the above-identified patent and that said Letters Patent is hereby corrected as shown below:

ON THE TITLE PAGE [56] References Cited:

OTHER PUBLICATIONS, "M.D. Radcliffe et al," should read
        --M.D. Radcliffe et al.,-- and "K. Miyasato et al,"
        should read --K. Miyasato et al.,--.

COLUMN 7:

Line 33, "or" should read --(or--.

COLUMN 8:

Line 12, "ia tetra valent-group" should read --a
        tetravalent group--.

COLUMN 10:

Line 61, "smectic,liquid" should read --smectic
        liquid--.

COLUMN 11:

Line 9, "glow" should read --grow--; and
    Line 66, "formula" should read --formula (II):--.

COLUMN 12:

Line 48, "of A" should read --of A',--;
    Line 60, "$-O-C_{qa}H_{21qa}-R,$" should read ---$O-C_{qa}H_{2qa}-R^3,$--; and
    Line 63, "$-O-CO-C\ H_{2qb+1},$" should read ---$O-COC_{qb}H_{2qb+1},$--.

UNITED STATES PATENT AND TRADEMARK OFFICE
CERTIFICATE OF CORRECTION

PATENT NO. : 6,083,574

DATED : July 4, 2000

INVENTOR(S) : YASUFUMI ASAO ET AL.

It is certified that error appears in the above-identified patent and that said Letters Patent is hereby corrected as shown below:

COLUMN 14:

Line 11, "$Z_2$" should read --$Z^2$--.

COLUMN 20:

Line 39, "20, an" should read --20, is an--.

COLUMN 33:

Line 36, "cite" should read --site--.

COLUMN 34:

Line 37, "smaller" should read --similar--; and
    Line 67, "are" should read --is--.

COLUMN 36:

Line 37, "smaller" should read --similar-- and "SmA1 → SmC*($SmC_A$*)" should read --SmA → SmC* ($SmC_A$*)--.

COLUMN 37:

Line 11, "point" should read --point)--;
    Line 16, "KW" should read --kW--;
    Line 52, "include" should read --includes--; and
    Line 58, "less" should read --smaller--.

UNITED STATES PATENT AND TRADEMARK OFFICE
CERTIFICATE OF CORRECTION

PATENT NO. : 6,083,574

DATED : July 4, 2000

INVENTOR(S) : YASUFUMI ASAO ET AL.

It is certified that error appears in the above-identified patent and that said Letters Patent is hereby corrected as shown below:

COLUMN 39:

Line 19, "by)" should read --by ●--; and
    Line 59, "a" should be deleted.

COLUMN 40:

Line 65, close up right margin;
    Line 66, close up left margin; and
    Line 67, "VS" should read --$V_s$--.

COLUMN 43:

Line 53, "phase." should read --phase).--.

COLUMN 44:

Line 46, "determinating" should read --determining--.

COLUMN 45:

Line 1, "device" should read --devices--; and
    Line 57, "provided" should read --provide--.

COLUMN 46:

Line 7, "device" should read --devices--; and
    Line 42, "source)" should read --(source)--.

COLUMN 47:

Line 3, "according to minimize an irregularity in device" should be deleted.

UNITED STATES PATENT AND TRADEMARK OFFICE
CERTIFICATE OF CORRECTION

PATENT NO. : 6,083,574
DATED : July 4, 2000
INVENTOR(S) : YASUFUMI ASAO ET AL.

Page 4 of 4

It is certified that error appears in the above-identified patent and that said Letters Patent is hereby corrected as shown below:

COLUMN 49:

Line 4, "of1-20." should read --of 1-20.--.

COLUMN 50:

Line 1, "$-O-(C\ H_{2qc}-O)_{wa}-C_{qd}H_{2qd+1}$," should read --$O-(C_{qc}H_{2qc}-O)_{wa}-C_{qd}H_{2qd+1}$,--; and
Line 16, "electrodes" should read --electrode--.

COLUMN 54:

Line 11, "atrix" should read --matrix--.

Signed and Sealed this

Twenty-second Day of May, 2001

Attest:

NICHOLAS P. GODICI

Attesting Officer    Acting Director of the United States Patent and Trademark Office